United States Patent
Fujimoto et al.

(10) Patent No.: US 10,809,418 B2
(45) Date of Patent: Oct. 20, 2020

(54) ANTI-GLARE HARD COAT LAMINATED FILM

(71) Applicant: RIKEN TECHNOS CORPORATION, Tokyo (JP)

(72) Inventors: Jun Fujimoto, Tokyo (JP); Nozomu Washio, Tokyo (JP); Taketo Hashimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 23 days.

(21) Appl. No.: 15/559,383

(22) PCT Filed: Feb. 4, 2016

(86) PCT No.: PCT/JP2016/053355
§ 371 (c)(1),
(2) Date: Sep. 18, 2017

(87) PCT Pub. No.: WO2016/147733
PCT Pub. Date: Sep. 22, 2016

(65) Prior Publication Data
US 2018/0067234 A1    Mar. 8, 2018

(30) Foreign Application Priority Data

Mar. 18, 2015 (JP) ................................ 2015-054437
Jan. 19, 2016 (JP) ................................ 2016-007568

(51) Int. Cl.
*G02B 1/111* (2015.01)
*C09D 7/40* (2018.01)
(Continued)

(52) U.S. Cl.
CPC .............. *G02B 1/111* (2013.01); *B32B 27/30* (2013.01); *B32B 27/302* (2013.01);
(Continued)

(58) Field of Classification Search
CPC ........... G02B 1/111; G02B 1/115; G02B 1/14; G02B 1/18; C09D 7/40; C09D 7/42;
(Continued)

(56) References Cited

U.S. PATENT DOCUMENTS 3,496,143 A    2/1970  Siggel et al.
6,055,823 A    5/2000  Baker et al.
(Continued)

FOREIGN PATENT DOCUMENTS

CN    103492913 A    1/2014
CN    104422239 A    3/2015
(Continued)

OTHER PUBLICATIONS

PCT/JP2016/052927 International Search Report dated Apr. 19, 2016; 2 pgs.
(Continued)

*Primary Examiner* — Ruiyun Zhang
(74) *Attorney, Agent, or Firm* — Bracewell LLP; Brad Y. Chin

(57) ABSTRACT

One embodiment provides a hard coat laminated film having, in order from a surface layer side, a first hard coat and a transparent resin film layer. The first hard coat includes a coating material not including inorganic particles and including: (A) 100 parts by mass polyfunctional (meth) acrylate; (B) 0.01-7 parts by mass water repellent; (C) 0.01-10 parts by mass silane coupling agent; and (D) 0.1-10 parts by mass resin microparticles having an average particle diameter of 0.5-10 μm. Another embodiment provides a hard coat laminated film having, in order from a surface layer side, a first hard coat, a second hard coat, and a resin film layer. The first hard coat includes a coating material that does not include inorganic particles. The second hard coat includes a coating material including inorganic particles.

(Continued)

The adhesive film fulfills the conditions: (i) a total light transmission rate of at least 85%; (ii) a pencil hardness for the first hard coat surface of at least 5H; and (iii) a Y value for an XYZ color system of 1.5%-4.2%.

17 Claims, 2 Drawing Sheets

(51) Int. Cl.
  *C08J 7/04* (2020.01)
  *B32B 27/30* (2006.01)
(52) U.S. Cl.
  CPC .......... *B32B 27/306* (2013.01); *B32B 27/308* (2013.01); *C08J 7/04* (2013.01); *C08J 7/0423* (2020.01); *C09D 7/40* (2018.01)
(58) Field of Classification Search
  CPC ..... B32B 27/30; B32B 27/302; B32B 27/306; B32B 27/308; C08J 7/04; C08J 7/042; C08J 7/045
  USPC ......... 428/1.1, 1.3, 1.33, 1.5, 212, 217, 218, 428/323, 336, 337, 421; 526/246, 247, 526/544; 524/544
  See application file for complete search history.

(56) References Cited

U.S. PATENT DOCUMENTS

| | | | |
|---|---|---|---|
| 6,489,015 | B1 | 12/2002 | Tsuchiya et al. |
| 10,596,739 | B2 | 3/2020 | Washio et al. |
| 2005/0249942 | A1 | 11/2005 | Coggio et al. |
| 2006/0134400 | A1 | 6/2006 | Takada et al. |
| 2006/0210727 | A1 | 9/2006 | Ibuki et al. |
| 2007/0231566 | A1 | 10/2007 | Yoneyama et al. |
| 2007/0291363 | A1 | 12/2007 | Asakura et al. |
| 2010/0147191 | A1 | 6/2010 | Sakano et al. |
| 2010/0210812 | A1 | 8/2010 | Urakawa et al. |
| 2012/0114892 | A1 | 5/2012 | Jung et al. |
| 2013/0059158 | A1 | 3/2013 | Oguro et al. |
| 2013/0084458 | A1 | 4/2013 | Yamada et al. |
| 2013/0222906 | A1 | 8/2013 | Tsunekawa et al. |
| 2014/0044891 | A1 | 2/2014 | Shibata et al. |
| 2014/0208657 | A1 | 7/2014 | Kim et al. |
| 2014/0227482 | A1 | 8/2014 | Shibata et al. |
| 2014/0360975 | A1 | 12/2014 | Hustad et al. |
| 2015/0203711 | A1 | 7/2015 | Kang et al. |
| 2016/0122525 | A1 | 5/2016 | Carloff et al. |
| 2016/0122573 | A1 | 5/2016 | Uprety et al. |
| 2016/0229159 | A1 | 8/2016 | Nakashima et al. |
| 2017/0095993 | A1 | 4/2017 | Tomomatsu et al. |
| 2017/0183543 | A1 | 6/2017 | Nagata et al. |
| 2017/0198164 | A1 | 7/2017 | Itagaki et al. |
| 2018/0072029 | A1 | 3/2018 | Nakashima et al. |

FOREIGN PATENT DOCUMENTS

| | | | |
|---|---|---|---|
| EP | 2873692 | A1 | 5/2015 |
| JP | S633011 | A | 1/1988 |
| JP | H0211665 | A | 1/1990 |
| JP | H0419142 | A | 1/1992 |
| JP | H0794061 | A | 4/1995 |
| JP | 2000052472 | A | 2/2000 |
| JP | 2000190430 | A | 7/2000 |
| JP | 2000214791 | A | 8/2000 |
| JP | 2000517455 | A | 12/2000 |
| JP | 2002062405 | A | 2/2002 |
| JP | 2006058574 | A | 3/2006 |
| JP | 2006215488 | A | 8/2006 |
| JP | 2007537059 | A | 12/2007 |
| JP | 2008026883 | A | 2/2008 |
| JP | 2008095064 | A | 4/2008 |
| JP | 2008201864 | A | 9/2008 |
| JP | 2008538195 | A | 10/2008 |
| JP | 2009114248 | A | 5/2009 |
| JP | 2009196125 | A | 9/2009 |
| JP | 2009279806 | A | 12/2009 |
| JP | 2010024255 | A | 2/2010 |
| JP | 2010064332 | A | 2/2010 |
| JP | 2010054861 | A | 3/2010 |
| JP | 2010060190 | A | 3/2010 |
| JP | 2010064332 | A | 3/2010 |
| JP | 2010078642 | A | 4/2010 |
| JP | 2010511206 | A | 4/2010 |
| JP | 2010131771 | A | * 6/2010 |
| JP | 2010131771 | A | 6/2010 |
| JP | 2010208035 | A | 9/2010 |
| JP | 2010211150 | A | 9/2010 |
| JP | 2010224150 | A | 10/2010 |
| JP | 2010241019 | A | 10/2010 |
| JP | 2010271400 | A | 12/2010 |
| JP | 2010275385 | A | 12/2010 |
| JP | 2011032350 | A | 2/2011 |
| JP | 2011032350 | A1 | 2/2011 |
| JP | 2011037927 | A | 2/2011 |
| JP | 2011512422 | A | 4/2011 |
| JP | 2011128439 | A | 6/2011 |
| JP | 2011133862 | A | 7/2011 |
| JP | 2011175040 | A | 9/2011 |
| JP | 2011201087 | A | 10/2011 |
| JP | 2011213989 | A | 10/2011 |
| JP | 2012062385 | A | 3/2012 |
| JP | 2012111943 | A | 6/2012 |
| JP | 2012234163 | A | 11/2012 |
| JP | 2012250438 | A | 12/2012 |
| JP | 2013075466 | A | 4/2013 |
| JP | 2013076029 | A | 4/2013 |
| JP | 2013142113 | A | * 7/2013 |
| JP | 2013142113 | A | 7/2013 |
| JP | 2013173871 | A | 9/2013 |
| JP | 201431397 | A | 2/2014 |
| JP | 2014024332 | A | 2/2014 |
| JP | 2014025061 | A | 2/2014 |
| JP | 2014040017 | A | 3/2014 |
| JP | 2014043101 | A | 3/2014 |
| JP | 2014062709 | A | 4/2014 |
| JP | 2014080536 | A | * 5/2014 |
| JP | 2014080536 | A | 5/2014 |
| JP | 2014117904 | A | 6/2014 |
| JP | 2014143831 | A | 8/2014 |
| JP | 2014152237 | A | 8/2014 |
| JP | 2014201681 | A | 10/2014 |
| JP | 2014238614 | A | 12/2014 |
| JP | 2015013472 | A | 1/2015 |
| JP | 2015013473 | A | 1/2015 |
| JP | 2015016683 | A | 1/2015 |
| JP | 2015033851 | A | 2/2015 |
| JP | 2015034285 | A | 2/2015 |
| JP | 2015034286 | A | 2/2015 |
| JP | 2015083370 | A | 4/2015 |
| JP | 2015151420 | A | 8/2015 |
| JP | 2015182272 | A | 10/2015 |
| JP | 2015182273 | A | 10/2015 |
| JP | 2015203770 | A | 11/2015 |
| JP | 2016006160 | A | 1/2016 |
| JP | 2016011365 | A | 1/2016 |
| JP | 5870222 | B1 | 2/2016 |
| JP | 5878255 | A | 3/2016 |
| JP | 2016050285 | A | 4/2016 |
| JP | 2016060839 | A | 4/2016 |
| JP | 2016172423 | A | 9/2016 |
| JP | 2016172424 | A | 9/2016 |
| JP | WO2015098495 | A1 | 3/2017 |
| JP | 2017200042 | A | 11/2017 |
| KR | 1020040094153 | A | 11/2001 |
| KR | 20100129512 | A | 12/2010 |
| KR | 10-2013-0058565 | A | 12/2014 |
| TW | 200609110 | A | 3/2006 |
| TW | 201300236 | A | 1/2013 |
| TW | 201420652 | A | 6/2014 |
| TW | 201437304 | A | 10/2014 |
| TW | 201504320 | A | 2/2015 |

(56) References Cited

FOREIGN PATENT DOCUMENTS

| | | |
|---|---|---|
| TW | 201602268 A | 1/2016 |
| WO | 2005113690 A2 | 12/2005 |
| WO | 2006102383 A1 | 9/2006 |
| WO | 2008029766 A1 | 3/2008 |
| WO | 2008067262 A1 | 6/2008 |
| WO | 2009113537 A1 | 9/2009 |
| WO | 2010079653 A1 | 7/2010 |
| WO | 2011033976 A1 | 3/2011 |
| WO | 2011145630 A1 | 11/2011 |
| WO | 2012026446 A1 | 3/2012 |
| WO | 2012144508 A1 | 10/2012 |
| WO | 2012144510 A1 | 10/2012 |
| WO | 2013129531 A1 | 9/2013 |
| WO | 2014030848 A1 | 2/2014 |
| WO | 2014203792 A1 | 12/2014 |
| WO | 2015005049 A1 | 1/2015 |
| WO | 2015146565 A1 | 1/2015 |
| WO | 2015033754 A1 | 3/2015 |
| WO | 2015045823 A1 | 4/2015 |
| WO | 2015098495 A1 | 7/2015 |
| WO | 2015001948 A1 | 8/2015 |
| WO | 2015171340 A1 | 11/2015 |
| WO | 2015182253 A1 | 12/2015 |
| WO | 2016147424 A1 | 9/2016 |
| WO | 2016147733 A1 | 9/2016 |
| WO | 2016147734 A1 | 9/2016 |
| WO | 2016147739 A1 | 9/2016 |
| WO | 2016147776 A1 | 9/2016 |

OTHER PUBLICATIONS

PCT/JP2016/052950 International Search Report dated Apr. 19, 2016; 2 pgs.
PCT/JP2016/053357 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
EP16764607.4 Search Report dated May 28, 2018; 8 pgs.
KR10-2017-7026048 Korean Office Action dated Nov. 1, 2018; 14 pgs.
EP16764550.6 Extended European Search Report dated Oct. 18, 2018; 8 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
CN201680015901.5 Office Action dated Jan. 28, 2019; 12 pgs.
EP16764564.7 Extended European Search Report dated Oct. 18, 2018; 8 pgs.
CN201580003516.4 Office Action dated Jan. 17, 2018; 20 pgs.
Lai, et al., Synthetic Process and Application of Silicone Products, 2nd Edition, Nov. 2009, 4 pgs.
PCT/JP2016/084794 International Search Report dated Jan. 25, 2017; 2 pgs.
JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
PCT/JP2016/084981 International Search Report dated Jan. 25, 2017; 2 pgs.
Artham, et al., Biodegradation of Aliphatic and Aromatic Polycarbonates, Macromol. Biosci, 2008, 8, 14-24. (Year: 2008).
PCT/JP2016/053355 International Search Report dated May 17, 2016; 2 pgs.
EP16764570.4 Search Report dated May 28, 2018; 8 pgs.
CN201680015902.X Office Action dated Feb. 3, 2019; 15 pgs.
KR10-2016-7017502 Decision of Rejection dated May 10, 2018; 8 pgs.
EP16764565.4 Extended European Search Report dated Oct. 18, 2018; 8 pgs.
CN201680015850.6 Office Action dated Jan. 24, 2019; 10 pgs.
KR10-2019-7001505 Office Action dated Feb. 20, 2019; 12 pgs.
KR10-2016-7017502 Office Action dated Oct. 27, 2017; 18pgs.
EP15885519.7 Extended European Search Report dated Oct. 18, 2018; 8pgs.
JP2017069555 Office Action dated Nov. 27, 2018; 8 pgs.
PCT/JP2016/084981 International Preliminary Report on Patentability dated Jun. 21, 2018; 13 pgs.
CN201680015900.0 Office Action dated Nov. 5, 2018; 12 pgs.
Chinese Patent Application No. 201680015900.0 dated Jun. 4, 2019; 8 pgs.
Chinese Patent Application No. 201680015984.8 dated Jun. 4, 2019; 8 pgs.
TW105104029 Office Action dated Mar. 7, 2019; 12 pgs.
EP16872835.0 Extended European Search Report dated Jul. 8, 2019; 6 pgs.
PCT/JP2017/040099 International Search Report dated Feb. 13, 2018; 4 pgs.
PCT/JP2017/027297 International Search Report dated Aug. 29, 2017; 2 pgs.
JP2017-152119 Office Action dated Aug. 7, 2018; 10 pgs.
EP16868622.8 Extended European Search Report dated May 20, 2019; 8 pgs.
TW105104027 Office Action dated Jun. 25, 2019; 21 pages.
TW105104026 Office Action dated Oct. 5, 2019; 10 pgs.
JP2017-094366 Office Action dated Nov. 18, 2019, 11 pgs.
TW105104050 Office Action dated Aug. 20, 2019; 12 pgs.
CN201680015984.8 Office Action dated Sep. 10, 2019, 13 pgs.
CN201680068951.X Office Action dated Sep. 29, 2019; 21 pgs.
CN201680015900.0 Office Action dated Sep. 10, 2019, 13 pgs.
TW105104240 Office Action dated Oct. 17, 2019, 10 pgs.
TW105104907 Office Action dated Oct. 18, 2019; 10 pages.
JP2016-17863 Office Action dated Oct. 8, 2019; 11 pgs.
CN201810254960.9 Office Action dated Oct. 11, 2019, 13 pgs.
CN201680015902.X Second Office Action dated Jul. 17, 2019; 16 pgs.
CN201811070889.5 Office Action dated Jan. 10, 2020, 15 pgs.
EP15885519.7 Third Party Observations dated Jan. 8, 2020, 85 pgs.
CN201680015902.X Office Action Jan. 2, 2020, 16 pgs.
JP2016-29588 Office Action dated Dec. 24, 2019, 7 pgs.
CN201680015908.7 Office Action dated Feb. 2, 2019; 12 pgs.
JP2017-94366 Office Action dated May 11, 2020, 15 pgs.
EP20150373.7 Extended European Search Report dated Apr. 7, 2020, 9 pgs.
JP2017-094366 Office Action dated May 11, 2020, 15 pgs.
EP20150365.3 Extended European Search Report dated Apr. 9, 2020, 8 pgs.
EP20150371.1 Extended European Search Report dated Apr. 7, 2020, 8 pgs.
JP2016-24288 Opposition Against JP6599789 dated Jun. 24, 2020, 64 pgs.
A Copy of Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
EP17874537.8 Supplementary Search Report dated May 14, 2020, 12 pgs.
EP17850559.0 Supplementary Search Report dated Mar. 18, 2020, 10 pgs.
CN201810254960.9 Second Office Action dated Jun. 9, 2020, 11 pgs.
CN201780055888.0 First Office Action dated Jul. 2, 2020, 11 pgs.

* cited by examiner

ANTI-GLARE HARD COAT LAMINATED FILM

CROSS REFERENCE TO RELATED APPLICATIONS

This application claims the benefit of and priority to PCT/JP2016/053355, filed on Feb. 4, 2016, entitled (translation), "ANTI-GLARE HARD COAT LAMINATED FILM," which claims the benefit of and priority to Japanese Patent Application Nos. 2015-054437, filed on Mar. 18, 2015, and 2015-007568, filed on Jan. 19, 2016, each of which is hereby incorporated by reference in their entirety into this application.

BACKGROUND

Field

Embodiments relate to an anti-glare hard coat laminated film. More specifically, embodiments relate to an anti-glare hard coat laminated film preferably having excellent abrasion resistance.

Description of Related Art

In recent years, a car navigation apparatus equipped with a touch panel installed on an image display apparatus such as a liquid crystal display, a plasma display, or an electroluminescence display and capable of inputting by touching the touch panel with a finger, a pen, or the like while watching a displayed object, has become popular.

In a car navigation apparatus, a plastic display face plate is often used, or a scattering-preventive film is often pasted on a surface of a glass display face plate in order to impart a high level of impact resistance and crack resistance from a viewpoint of safety in a case of a traffic accident. In addition, an anti-glare property is imparted to an image display apparatus of a car navigation apparatus in order to address a problem that light from the outside is incident on a screen and this light is reflected to make it difficult to see a displayed image. Generally, the anti-glare property is imparted by pasting an anti-glare hard coat laminated film on a surface of a plastic display face plate or by forming an anti-glare hard coat on a surface of a scattering-preventive film.

Many proposals have been made as an anti-glare hard coat laminated film (for example, JP 2010-211150 A). However, considering the fact that a car navigation apparatus is equipped with a touch panel, abrasion resistance thereof is insufficient. Therefore, an anti-glare hard coat laminated film capable of maintaining surface characteristics such as finger slidability even after repeated wipes with a handkerchief or the like has been required.

SUMMARY

An object of the various embodiments is to provide an anti-glare hard coat laminated film having an excellent anti-glare property, suitable for a member of an image display apparatus such as a liquid crystal display, a plasma display, or an electroluminescence display (including an image display apparatus having a touch panel function and an image display apparatus having no touch panel function). Another object of the various embodiments is to provide an anti-glare hard coat laminated film having an excellent anti-glare property, preferably having excellent abrasion resistance, suitable for a member of an apparatus having a touch panel function, often used in an environment where light from the outside is incident on a screen, such as a car navigation apparatus.

According to at least one embodiment, the above object can be achieved by a specific hard coat laminated film.

According to at least one embodiment, there is provided a hard coat laminated film including, in order from a surface layer side, a first hard coat and a transparent resin film layer, in which the first hard coat is formed of a coating material including: (A) 100 parts by mass of a polyfunctional (meth) acrylate; (B) 0.01 to 7 parts by mass of a water repellent; (C) 0.01 to 10 parts by mass of a silane coupling agent; and (D) 0.1 to 10 parts by mass of resin microparticles having an average particle diameter of 0.5 to 10 µm, and containing no inorganic particles.

According to at least one embodiment, the hard coat laminated film further includes, in order from a surface layer side, the first hard coat, a second hard coat, and the transparent resin film layer, in which the second hard coat is formed of a coating material including: (A) 100 parts by mass of the polyfunctional (meth)acrylate; and (E) 50 to 300 parts by mass of inorganic microparticles having an average particle diameter of 1 to 300 nm.

According to at least one embodiment, the (C) silane coupling agent includes one or more selected from the group consisting of a silane coupling agent having an amino group and a silane coupling agent having a mercapto group.

According to at least one embodiment, the (B) water repellent includes a (meth)acryloyl group—including fluoropolyether water repellent.

According to at least one embodiment, the second hard coat forming coating material further includes 0.01 to 1 part by mass of (F) a leveling agent.

According to at least one embodiment, the first hard coat has a thickness of from 0.5 to 5 µm.

According to at least one embodiment, the second hard coat has a thickness of from 15 to 30 µm.

According to another embodiment, there is provided a hard coat laminated film including, in order from a surface layer side, a first hard coat, a second hard coat, and a resin film layer, in which the first hard coat is formed of a coating material containing no inorganic particles, the second hard coat is formed of a coating material containing inorganic particles, and the following (i) to (iii) are satisfied: (i) a total light transmission rate of 85% or more; (ii) a pencil hardness on the first hard coat surface of 5 H or more; (iii) a Y value of XYZ color system of 1.5 to 4.2%.

According to at least one embodiment, the hard coat laminated film has a minimum bending radius of 40 mm or less.

According to at least one embodiment, the hard coat laminated film has a water contact angle at the first hard coat surface after 10,000 reciprocating wipes with a cotton of 100° or more.

According to another embodiment, there is provided use of the hard coat laminated film described above as a member of an image display apparatus.

According to another embodiment, there is provided an image display apparatus including the hard coat laminated film described above.

An anti-glare hard coat laminated film according to at least one embodiment has an excellent anti-glare property. A preferable anti-glare hard coat laminated film according to at least one embodiment has excellent anti-glare property and excellent abrasion resistance. Therefore, this anti-glare hard coat laminated film can be used suitably as a member of an image display apparatus such as a liquid crystal display, a plasma display, or an electroluminescence display (including an image display apparatus having a touch panel function and an image display apparatus having no touch panel function), particularly as a member of an apparatus having a touch panel function, often used in an environment where light from the outside is incident on a screen, such as a car navigation apparatus.

DETAILED DESCRIPTION

Figure 1:
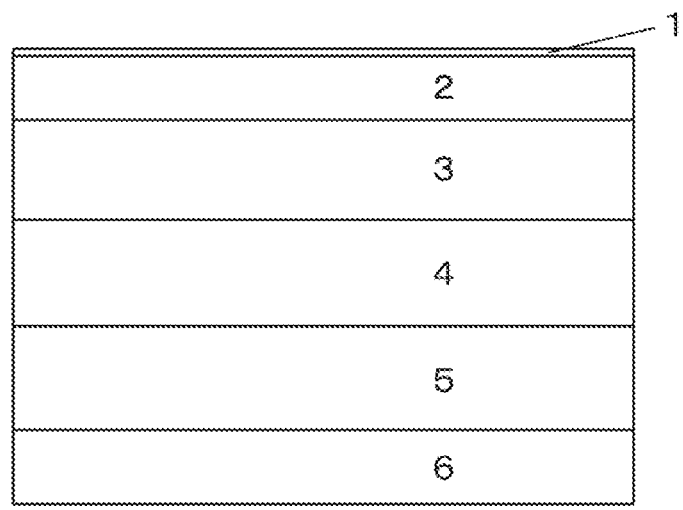
FIG. 1 is a cross-sectional view exemplifying an anti-glare hard coat laminated film according to at least one embodiment.

An anti-glare hard coat laminated film according to at least one embodiment includes, in order from a surface layer side, a first hard coat and a transparent resin film layer. The anti-glare hard coat laminated film according to at least one embodiment preferably includes, in order from a surface layer side, a first hard coat, a second hard coat, and a transparent resin film layer.

The "surface layer side" referred to herein means a side closer to an outer surface (a visible surface in a case of a display face plate) when an article formed of an anti-glare hard coat laminated film is used on site. In addition, herein, disposing one layer on a "surface layer side" of another layer includes that these layers are in direct contact with each other and that another single layer or a plurality of other layers is interposed therebetween.

First Hard Coat

The first hard coat usually forms a surface of the anti-glare hard coat laminated film according to at least one embodiment. When the anti-glare hard coat laminated film according to at least one embodiment is used as a member of an image display apparatus having a touch panel function, the first hard coat usually forms a touch surface. The first hard coat exhibits a good anti-glare property, preferably good abrasion resistance, and can maintain surface characteristics such as finger slidability even after repeated wipes with a handkerchief or the like.

The first hard coat is formed of a coating material not containing inorganic particles. The first hard coat is preferably formed of a coating material including (A) 100 parts by mass of a polyfunctional (meth)acrylate, (B) 0.01 to 7 parts by mass of a water repellent, (C) 0.01 to 10 parts by mass of a silane coupling agent, and (D) 0.1 to 10 parts by mass of resin microparticles having an average particle diameter of 0.5 to 10 μm, and containing no inorganic particles.

The term "inorganic particles" referred to herein means particles not including particles formed of an organic substance (i.e. a substance which can generate water and carbon dioxide by combustion).

The inorganic particles (for example, silica (silicon dioxide); metal oxide particles of aluminum oxide, zirconia, titania, zinc oxide, germanium oxide, indium oxide, tin oxide, indium tin oxide, antimony oxide, cerium oxide, or the like; metal fluoride particles of magnesium fluoride, sodium fluoride, or the like; metal sulfide particles; metal nitride particles; and metal particles) are highly effective in enhancing hardness of a hard coat. In addition, the inorganic particles having an appropriate particle diameter can improve an anti-glare property. On the other hand, an interaction between the inorganic particles and a resin component such as component (A) is weak, resulting in insufficient abrasion resistance. Therefore, the present invention has solved this problem by using resin microparticles not containing inorganic particles as particles for improving an anti-glare property in the first hard coat forming a surface to retain abrasion resistance, and allowing the second hard coat to preferably contain a specific amount of inorganic particles having an average particle diameter of 1 to 300 nm to enhance hardness.

Here, "containing no" inorganic particles means not containing a significant amount of inorganic particles. In the field of a hard coat forming coating material, the significant amount of inorganic particles is usually about 0.1 part by mass or more relative to 100 parts by mass of component (A) from a viewpoint of imparting an anti-glare property. Therefore, "containing no" inorganic particles can be paraphrased as follows. That is, the amount of inorganic particles is usually 0 part by mass or more and usually less than 0.1 part by mass, preferably 0.05 parts by mass or less, and more preferably 0.01 part by mass or less relative to 100 parts by mass of component (A).

(A) Polyfunctional (Meth)Acrylate

The polyfunctional (meth)acrylate of component (A) is a (meth)acrylate having two or more (meth)acryloyl groups in one molecule. This component has two or more (meth)acryloyl groups in one molecule, and therefore acts to form a hard coat through polymerization and curing with an active energy ray such as an ultraviolet ray or an electron beam.

The polyfunctional (meth)acrylate of component (A) is distinguished from the resin microparticles of component (D) having an average particle diameter of 0.5 to 10 μm (the resin includes a polyfunctional (meth)acrylate) in that the polyfunctional (meth)acrylate of component (A) is not used in a form of microparticles unlike the resin microparticles of component (D).

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate, trimethylolethane tri(meth)acrylate, or pentaerythritol tri (meth)acrylate; a (meth)acryloyl group-containing tetrafunctional reactive monomer such as pentaerythritol tetra (meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (oligomer and prepolymer) containing one or more kinds thereof as constituent monomers. As the polyfunctional (meth)acrylate of component (A), these compounds can be used singly or in a mixture of two or more kinds thereof.

It should be noted that a (meth)acrylate herein means an acrylate or a methacrylate.

(B) Water Repellent

The water repellent of component (B) enhances finger slidability, resistance to fouling deposition, and wipeability against fouling.

Examples of the water repellent include a wax water repellent such as a paraffin wax, a polyethylene wax, or an acrylate-ethylene copolymer wax; a silicone water repellent such as a silicone oil, a silicone resin, a polydimethylsiloxane, or an alkylalkoxysilane; and a fluorine-containing water repellent such as a fluoropolyether water repellent or a fluoropolyalkyl water repellent. As the water repellent of component (B), these compounds can be used singly or in a mixture of two or more kinds thereof.

Among these compounds, a fluoropolyether water repellent is preferable as the water repellent of component (B) from a viewpoint of water repellency. A water repellent including a compound having a (meth)acryloyl group and a fluoropolyether group in a molecule (hereinafter, abbreviated as a (meth)acryloyl group-containing fluoropolyether water repellent) is more preferable as the water repellent of component (B) from a viewpoint of preventing a trouble such as bleed-out of component (B) because of a chemical bond or a strong interaction between the polyfunctional (meth)acrylate of component (A) and component (B). An admixture of an acryloyl group-containing fluoropolyether water repellent and a methacryloyl group-containing fluoropolyether water repellent is still more preferable as the water repellent of component (B) from a viewpoint of appropriately controlling a chemical bond or an interaction between the polyfunctional (meth)acrylate of component (A) and the water repellent of component (B) to exhibit good water repellency while keeping high transparency.

It should be noted that the (meth)acryloyl group-containing fluoropolyether water repellent is clearly distinguished from component (A) by the presence or absence of a fluoropolyether group in a molecule. Here, a compound having two or more (meth)acryloyl groups and a fluoropolyether group in one molecule is a (meth)acryloyl group-containing fluoropolyether water repellent, which is component (B). That is, a compound having a fluoropolyether group is excluded from definition of the polyfunctional (meth)acrylate of component (A).

The blending amount of the water repellent of component (B) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of component (B). At the same time, the blending amount of the water repellent of component (B) is usually 0.01 part by mass or more, preferably 0.05 parts by mass or more, and more preferably 0.1 part by mass or more from a viewpoint of obtaining an effect of use of the water repellent of component (B). The blending amount of the water repellent may be usually 0.01 part by mass or more and 7 part by mass or less, preferably 0.01 part by mass or more and 4 parts by mass or less, or 0.01 part by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 part by mass or more and 7 parts by mass or less, 0.1 part by mass or more and 4 parts by mass or less, or 0.1 part by mass or more and 2 parts by mass or less relative to 100 parts by mass of the polyfunctional (meth)acrylate of component (A).

(C) Silane Coupling Agent

The silane coupling agent of component (C) acts to enhance adhesiveness between the first hard coat and the transparent resin film or the second hard coat.

The silane coupling agent is a silane compound having at least two kinds of different reactive groups selected from a hydrolyzable group (for example, an alkoxy group such as a methoxy group and an ethoxy group; an acyloxy group such as an acetoxy group; or a halogen group such as a chloro group) and an organic functional group (for example, an amino group, a mercapto group, a vinyl group, an epoxy group, a methacryloxy group, an acryloxy group, or an isocyanate group). Among these compounds, a silane coupling agent having an amino group (i.e. a silane compound having an amino group and a hydrolyzable group) and a silane coupling agent having a mercapto group (i.e. a silane compound having a mercapto group and a hydrolyzable group) are preferable as the silane coupling agent of component (C) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

As the silane coupling agent of component (C), these compounds can be used singly or in a mixture of two or more kinds thereof.

The blending amount of the silane coupling agent of component (C) is usually 0.01 part by mass or more, preferably 0.05 parts by mass or more, and more preferably 0.1 part by mass or more relative to 100 parts by mass of the polyfunctional (meth)acrylate of component (A) from a viewpoint of obtaining an adhesiveness-enhancing effect reliably. At the same time, the blending amount of the silane coupling agent of component (C) may be usually 10 parts by mass or less, preferably 5 parts by mass or less, and more preferably 1 part by mass or less from a viewpoint of a pot life of a coating material. The blending amount of the silane coupling agent may be usually 0.01 part by mass or more and 10 part by mass or less, preferably 0.01 part by mass or more and 5 parts by mass or less, or 0.01 part by mass or more and 1 part by mass or less, preferably 0.05 parts by mass or more and 10 parts by mass or less, 0.05 parts by mass or more and 5 parts by mass or less, or 0.05 parts by mass or more and 1 part by mass or less, or preferably 0.1 part by mass or more and 10 parts by mass or less, 0.1 part by mass or more and 5 parts by mass or less, or 0.1 part by mass or more and 1 part by mass or less relative to 100 parts by mass of the polyfunctional (meth)acrylate of component (A).

It should be noted the blending amount of the silane coupling agent of component (C) in any usual or preferable range referred to herein can be combined with the blending amount of the water repellent of component (B) in any usual or preferable range referred to above.

(D) Resin Microparticles Having an Average Particle Diameter of 0.5 to 10 μm

The resin microparticles of component (D) act to impart an anti-glare property to the anti-glare hard coat laminated film according to at least one embodiment, and makes a display image visible even when light from the outside is incident on a screen of an image display apparatus and this light is reflected.

Examples of the resin microparticles include resin microparticles of a silicon-based resin (silicone resin), a styrene resin, an acrylic resin, a fluorine resin, a polycarbonate resin, an ethylene resin, and a cured resin of an amino compound and formaldehyde. Among these compounds, microparticles of a silicone resin, an acrylic resin, and a fluorine resin are preferable from a viewpoint of low specific gravity, lubricity, dispersibility, and solvent resistance. Truly spherical resin microparticles are preferable from a viewpoint of improving light diffusibility. As the resin microparticles, these compounds can be used singly or in a mixture of two or more kinds thereof. The resin microparticles may be at least one selected from the group consisting of silicone resin, acrylic resin, and fluorine resin microparticles. In addition, the resin microparticles may be at least one selected from the group consisting of silicone resin and acrylic resin microparticles.

The average particle diameter of the resin microparticles of component (D) is usually 0.5 µm or more, and preferably 1 µm or more from a viewpoint of reliably obtaining an anti-glare property. At the same time, the average particle diameter of the resin microparticles of component (D) is usually 10 µm or less, and preferably 6 µm or less from a viewpoint of retaining transparency of a hard coat. The average particle diameter of the resin microparticles of component (D) may be usually 0.5 µm or more and 10 µm or less, and preferably 0.5 µm or more and 6 µm or less, 1 µm or more and 10 µm or less, or 1 µm or more and 6 µm or less.

Incidentally, here, the average particle diameter of the resin microparticles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

The resin microparticles of component (D) are preferably spherical, and more preferably truly spherical from a viewpoint of improving light diffusibility. The fact that the resin microparticles of component (D) are truly spherical means that the sphericity of the particles may be preferably 0.90 or more, and more preferably 0.95 or more. The sphericity is a measure for indicating how spherical a particle is. The sphericity referred to herein is obtained by dividing a surface area of a sphere having the same volume as a particle by a surface area of the particle, and can be represented by $\psi = (6 V_p)^{2/3} \pi^{1/3} / A_p$. Here, $V_p$ represents a particle volume, and $A_p$ represents a particle surface area. The sphericity is 1 for a spherical particle.

The blending amount of the resin microparticles of component (D) is usually from 0.1 to 10 parts by mass, preferably from 0.1 to 5 parts by mass, more preferably from 0.2 to 5 parts by mass, and still more preferably from 0.3 to 3 parts by mass relative to 100 parts by mass of component (A), although depending on the level of an anti-glare property to be imparted. The blending amount of the resin microparticles of component (D) may be preferably from 0.5 to 3 parts by mass from a viewpoint of abrasion resistance. According to another aspect, the blending amount of the resin microparticles of component (D) may be preferably from 0.1 to 3 parts by mass, from 0.2 to 10 parts by mass, from 0.2 to 3 parts by mass, from 0.3 to 10 parts by mass, or from 0.3 to 5 parts by mass relative to 100 parts by mass of component (A).

The first hard coat forming coating material preferably further includes a compound having two or more isocyanate groups (—N=C=O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as blocked isocyanates of the polyisocyanates. As the compound having two or more isocyanate groups in one molecule, these compounds can be used singly or in a mixture of two or more kinds thereof. In crosslinking, a catalyst such as dibutyltin dilaurate or dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin compound such as benzoin, benzoin methyl ether, benzoin ethyl ether, benzoin isopropyl ether, or benzyl methyl ketal; an acetophenone compound such as acetophenone, 2,2-dimethoxy-2-phenylacetophenone, or 1-hydroxycyclohexyl phenyl ketone; an anthraquinone compound such as methylanthraquinone, 2-ethylanthraquinone, or 2-amylanthraquinone; a thioxanthone compound such as thioxanthone, 2,4-diethylthioxanthone, or 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. As the photopolymerization initiator, these compounds can be used singly or in a mixture of two or more kinds thereof.

The first hard coat forming coating material can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic microparticles, and an organic colorant, as desired.

The first hard coat forming coating material may include a solvent as desired for dilution to a concentration which allows easy application. The solvent is not particularly limited as long as the solvent neither reacts with any of components (A) to (D) and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these compounds can be used singly or in a mixture of two or more kinds thereof.

The first hard coat forming coating material can be obtained by mixing and stirring these components.

A method for forming the first hard coat using the first hard coat forming coating material is not particularly limited, but a known web applying method can be used. Examples of the web applying method include roll coating, gravure coating, reverse coating, roll brushing, spray coating, air knife coating, dip coating, and die coating.

The thickness of the first hard coat is preferably 0.5 μm or more, more preferably 1 μm or more, and still more preferably 1.5 μm or more from a viewpoint of abrasion resistance and surface hardness. At the same time, the thickness of the first hard coat is preferably 5 μm or less, more preferably 4 μm or less, and still more preferably 3 μm or less from a viewpoint of an anti-glare property, surface hardness, adhesiveness, and bending resistance. The thickness of the first hard coat may be preferably 0.5 μm or more and 5 μm or less, and more preferably 0.5 μm or more and 4 μm or less, 0.5 μm or more and 3 μm or less, 1 μm or more and 5 μm or less, 1 μm or more and 4 μm or less, 1 μm or more and 3 μm or less, 1.5 μm or more and 5 μm or less, 1.5 μm or more and 4 μm or less, or 1.5 μm or more and 3 μm or less.

Second Hard Coat

The anti-glare hard coat laminated film according to at least one embodiment preferably includes, in order from a surface layer side, a first hard coat, a second hard coat, and a transparent resin film layer. The second hard coat increases hardness of the anti-glare hard coat laminated film according to at least one embodiment, and thereby enhances surface hardness. The second hard coat is formed of a coating material containing inorganic particles. The second hard coat is preferably formed of a coating material including 100 parts by mass of the (A) polyfunctional (meth)acrylate and 50 to 300 parts by mass of the (E) inorganic microparticles having an average particle diameter of 1 to 300 nm.

As the (A) polyfunctional (meth)acrylate for the second hard coat, the same compounds as those described above for the first hard coat forming coating material can be used. As the polyfunctional (meth)acrylate of component (A), these compounds can be used singly or in a mixture of two or more kinds thereof.

(E) Inorganic Microparticles Having an Average Particle Diameter of 1 to 300 nm

The inorganic microparticles of component (E) act to dramatically enhance hardness of the hard coat laminated film according to at least one embodiment.

Examples of the inorganic microparticles include silica (silicon dioxide); metal oxide microparticles formed of aluminum oxide, zirconia, titania, zinc oxide, germanium oxide, indium oxide, tin oxide, indium tin oxide, antimony oxide, cerium oxide, or the like; metal fluoride microparticles formed of magnesium fluoride, sodium fluoride, or the like; metal sulfide microparticles; metal nitride microparticles; and metal microparticles.

Among these compounds, microparticles formed of silica or aluminum oxide are preferable, and microparticles formed of silica are more preferable in order to obtain a hard coat having higher hardness. Examples of commercially available silica microparticles include Snowtex (trade name) available from Nissan Chemical Industries, Ltd. and Quartron (trade name) available from Fuso Chemical Co., Ltd.

In order to enhance dispersibility of inorganic microparticles in a coating material or enhance hardness of a hard coat to be obtained, it is preferable to use inorganic microparticles the surface of which have been treated with a silane coupling agent such as vinylsilane or aminosilane; a titanate coupling agent; an aluminate coupling agent; an organic compound having a reactive functional group such as an ethylenically unsaturated bond group such as a (meth) acryloyl group, a vinyl group, or an allyl group, or an epoxy group; a surface-treatment agent such as a fatty acid or a fatty acid metal salt; or the like.

As the inorganic microparticles of component (E), these compounds can be used singly or in a mixture of two or more kinds thereof.

The average particle diameter of the inorganic microparticles of component (E) is 300 nm or less, preferably 200 nm or less, and more preferably 120 nm or less from a viewpoint of retaining transparency of a hard coat and obtaining a hardness-improving effect reliably. On the other hand, the lower limit of the average particle diameter is not particularly specified, but the average particle diameter of inorganic microparticles usually available is about 1 nm at the finest.

Incidentally, here, the average particle diameter of the inorganic microparticles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

The blending amount of the inorganic microparticles of component (E) is usually 50 parts by mass or more, and preferably 80 parts by mass or more relative to 100 parts by mass of the polyfunctional (meth)acrylate of component (A) from a viewpoint of hardness. At the same time, the blending amount of the inorganic microparticles of component (E) is preferably 300 parts by mass or less, more preferably 200 parts by mass or less, and still more preferably 160 parts by mass or less from a viewpoint of transparency. The blending amount of the inorganic microparticles may be usually 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, 80 parts by mass or more and 200 parts by mass or less, or 80 parts by mass or more and 160 parts by mass or less relative to 100 parts by mass of the polyfunctional (meth)acrylate of component (A).

(F) Leveling Agent

The second hard coat forming coating material preferably further includes (F) a leveling agent from a viewpoint of smoothing the second hard coat surface to form the first hard coat more easily.

Examples of the leveling agent of component (F) include an acrylic leveling agent, a silicone leveling agent, a fluorine leveling agent, a silicone-acrylate copolymer leveling agent, a fluorine-modified acrylic leveling agent, a fluorine-modified silicone leveling agent, and a leveling agent into which a functional group (for example, an alkoxy group such as a methoxy group or an ethoxy group, an acyloxy group, a halogen group, an amino group, a vinyl group, an epoxy group, a methacryloxy group, an acryloxy group, or an isocyanate group) is introduced. Among these compounds, a silicone-acrylate copolymer leveling agent is preferable as the leveling agent of component (F). As the leveling agent of component (F), these compounds can be used singly or in a mixture of two or more kinds thereof.

The blending amount of the leveling agent of component (F) is usually 0.01 part by mass or more, preferably 0.1 part by mass or more, and more preferably 0.2 parts by mass or more relative to 100 parts by mass of the polyfunctional (meth)acrylate of component (A) from a viewpoint of smoothing the second hard coat surface to form the first hard coat more easily. At the same time, the blending amount of the leveling agent of component (F) may be 1 part by mass or less, preferably 0.6 parts by mass or less, and more preferably 0.4 parts by mass or less from a viewpoint of satisfactorily applying the first hard coat forming coating material onto the second hard coat without being repelled.

The blending amount of the leveling agent may be usually 0.01 part by mass or more and 1 part by mass or less, preferably 0.01 part by mass or more and 0.6 parts by mass or less, or 0.01 part by mass or more and 0.4 parts by mass or less, preferably 0.1 part by mass or more and 1 part by mass or less, 0.1 part by mass or more and 0.6 parts by mass or less, or 0.1 part by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less relative to 100 parts by mass of the polyfunctional (meth)acrylate of component (A).

It should be noted that the blending amount of the leveling agent of component (F) in any usual or preferable range referred to herein can be combined with the blending amount of the inorganic microparticles of component (E) in any usual or preferable range referred to above.

The second hard coat forming coating material preferably further includes a compound having two or more isocyanate groups (—N=C=O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. As the compound having two or more isocyanate groups in one molecule, these compounds can be used singly or in a mixture of two or more kinds thereof.

As the photopolymerization initiator for the second hard coat, the same compounds as those described above for the first hard coat forming coating material can be used. As the photopolymerization initiator, these compounds can be used singly or in a mixture of two or more kinds thereof.

The second hard coat forming coating material can include one or more additives such as an antistatic agent, a surfactant, a thixotropy-imparting agent, an anti-fouling agent, a printability improver, an antioxidant, a weather resistance stabilizer, a light resistance stabilizer, an ultraviolet absorber, a heat stabilizer, a colorant, and organic microparticles, as desired.

The second hard coat forming coating material may include a solvent as desired for dilution to a concentration which allows easy application. The solvent is not particularly limited as long as the solvent neither reacts with component (A) or (E) or other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these compounds, 1-methoxy-2-propanol is preferable. As the solvent, these compounds can be used singly or in a mixture of two or more kinds thereof.

The second hard coat forming coating material can be obtained by mixing and stirring these components.

A method for forming the second hard coat using the second hard coat forming coating material is not particularly limited, but a known web applying method can be used. Specifically, examples of the method include roll coating, gravure coating, reverse coating, roll brushing, spray coating, air knife coating, and die coating.

The thickness of the second hard coat is preferably 10 μm or more, more preferably 15 μm or more, and still more preferably 18 μm or more from a viewpoint of hardness. At the same time, the thickness of the second hard coat is preferably 30 μm or less, more preferably 27 μm or less, and still more preferably 25 μm or less from a viewpoint of impact resistance. The thickness of the second hard coat may be preferably 10 μm or more and 30 μm or less, and more preferably 10 μm or more and 27 μm or less, 10 μm or more and 25 μm or less, 15 μm or more and 30 μm or less, 15 μm or more and 27 μm or less, 15 μm or more and 25 μm or less, 18 μm or more and 30 μm or less, 18 μm or more and 27 μm or less, or 18 μm or more and 25 μm or less.

It should be noted that the thickness of the second hard coat in any preferable range referred to herein can be combined with the thickness of the first hard coat in any preferable range referred to above.

Transparent Resin Film

The transparent resin film is a layer functioning as a transparent film substrate for forming the first hard coat, or the first hard coat and the second hard coat thereon.

The transparent resin film is not limited as long as having high transparency and being not colored, and any transparent resin film can be used. Examples of the transparent resin film include a film formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate, polyethyl methacrylate, or a vinylcyclohexane-methyl (meth)acrylate copolymer; an aromatic polycarbonate resin; a polyolefin resin such as polypropylene or poly(4-methyl-pentene-1); a polyamide resin; a polyarylate resin; a polymer-type urethane acrylate resin; or a polyimide resin. These transparent resin films include an unstretched film, a uniaxially stretched film, and a biaxially stretched film. In addition, the transparent resin film includes a laminated film obtained by laminating two or more layers of one or more kinds of these films.

The thickness of the transparent resin film is not particularly limited, but can be any thickness as desired. The thickness of the transparent resin film may be usually 20 μm or more, and preferably 50 μm or more from a viewpoint of handleability of the anti-glare hard coat laminated film according to at least one embodiment. When the anti-glare hard coat laminated film according to at least one embodiment is used for an application not requiring high rigidity, the thickness of the film may be usually 250 μm or less, and preferably 150 μm or less from a viewpoint of economic efficiency. Therefore, in such an application, the thickness of the transparent resin film may be preferably 20 μm or more and 250 μm or less, 20 μm or more and 150 μm or less, 50 μm or more and 250 μm or less, or 50 μm or more and 150 μm or less.

When the hard coat laminated film according to at least one embodiment is used as a display face plate of a car navigation apparatus, the thickness of the transparent resin film may be usually 100 μm or more, preferably 200 μm or more, and more preferably 300 μm or more from a viewpoint of retaining rigidity. In addition, the thickness of the transparent resin film may be usually 1500 μm or less, preferably 1200 μm or less, and more preferably 1000 μm or less from a viewpoint of meeting a requirement for a thinner apparatus. Therefore, in such an application, the thickness of the transparent resin film may be preferably 100 μm or more and 1500 μm or less, 100 μm or more and 1200 μm or less, 100 μm or more and 1000 μm or less, 200 μm or more and 1500 μm or less, 200 μm or more and 1200 μm or less, 200 μm or more and 1000 μm or less, 300 μm or more and 1500 μm or less, 300 μm or more and 1200 μm or less, or 300 μm or more and 1000 μm or less.

It should be noted that the thickness of the transparent resin film in any preferable range referred to herein can be combined with the thickness(es) of the first hard coat and/or the second hard coat in any preferable range referred to above.

The transparent resin film is preferably a transparent resin film of an acrylic resin.

Examples of the acrylic resin include a (meth)acrylate (co)polymer, a copolymer containing a structural unit derived from a (meth)acrylate, and a modified product thereof. The term (meth)acrylic herein means acrylic or methacrylic. The term (co)polymer means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer containing a structural unit derived from a (meth)acrylate include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidating agent (for example, methylamine, cyclohexylamine, or ammonia) (hereinafter, also referred to as a "poly (meth)acrylimide resin").

Examples of the transparent resin film of an acrylic resin include a film formed of one kind thereof or a mixture of two or more kinds thereof. The transparent resin film of an acrylic resin includes a laminated film obtained by laminating two or more layers of one or more kinds thereof.

The transparent resin film is more preferably a film of a vinylcyclohexane-methyl (meth)acrylate copolymer. By using such a transparent resin film, an anti-glare hard coat laminated film which is excellent in surface hardness, abrasion resistance, transparency, surface smoothness, appearance, rigidity, and moisture resistance is obtained, and can be used suitably for a display face plate of a touch panel.

The transparent resin film is more preferably a poly(meth)acrylimide resin film. By using such a transparent resin film, an anti-glare hard coat laminated film which is excellent in surface hardness, abrasion resistance, transparency, surface smoothness, appearance, rigidity, heat resistance, and heat resistant dimensional stability is obtained, and can be used suitably for a display face plate of a touch panel or a transparent conductive substrate.

The poly(meth)acrylimide resin is a thermoplastic resin obtained by introducing characteristics of excellent heat resistance and excellent dimensional stability derived from a polyimide resin and overcoming a drawback of being colored from pale yellow to reddish brown while high transparency, high surface hardness, and high rigidity derived from an acrylic resin are retained. Such a poly(meth)acrylimide resin is disclosed in JP 2011-519999 A, for example. It should be noted that the term poly(meth)acrylimide herein means a polyacrylimide or a polymethacrylimide.

The poly(meth)acrylimide resin is not limited as long as having high transparency and being not colored for the purpose of using a hard coat laminated film for a member of a screen display apparatus, and any poly(meth)acrylimide resin can be used.

The glass transition temperature of the poly(meth)acrylimide resin is preferably 150° C. or higher from a viewpoint of heat resistance. The glass transition temperature is more preferably 170° C. or higher.

Commercially available examples of the poly(meth)acrylimide resin include "PLEXIMID TT50" (trade name) and "PLEXIMID TT70" (trade name) available from Evonik Industries AG.

The yellowness index (measured according to JIS K7105: 1981 using a chromaticity meter "SolidSpec-3700" (trade name) available from Shimadzu Corporation) of the acrylic resin is preferably 3 or less, more preferably 2 or less, and still more preferably 1 or less. By using an acrylic resin having a yellowness index of 3 or less, it is possible to obtain an anti-glare hard coat laminated film which can be suitably used as a member of an image display apparatus. A lower yellowness index is more preferable.

The melt mass flow rate (measured under the conditions of 260° C. and 98.07 N according to ISO 1133) of the acrylic resin is preferably from 0.1 to 20 g/10 min, and more preferably from 0.5 to 10 g/10 min. from a viewpoint of an extrusion load or stability of a melted film.

The acrylic resin can further include, within a range not contrary to an object according to at least one embodiment, a thermoplastic resin other than the acrylic resin; a pigment, an inorganic filler, an organic filler, and a resin filler; an additive such as a lubricant, an antioxidant, a weather resistance stabilizer, a heat stabilizer, a release agent, an antistatic agent, or a surfactant; or the like, as desired. The blending amount of the optional component(s) is usually about from 0.01 to 10 parts by mass relative to 100 parts by mass of the acrylic resin.

The transparent resin film is more preferably a transparent multilayer film obtained by sequentially laminating a first acrylic resin layer ($\alpha 1$), an aromatic polycarbonate resin layer ($\beta$), and a second acrylic resin layer ($\alpha 2$) directly in this order. A preferable specific example of the transparent resin film is a transparent multilayer film obtained by sequentially laminating the first poly(meth)acrylimide resin layer ($\alpha 1$), the aromatic polycarbonate resin layer ($\beta$), and the second poly(meth)acrylimide resin layer ($\alpha 2$) directly in this order. Incidentally, here, when the hard coat laminated film is used as a member of an image display apparatus having a touch panel function, the present invention is described by assuming that a touch surface is formed on a side of the $\alpha 1$ layer.

The acrylic resin has excellent surface hardness, but tends to have insufficient cutting processability. Meanwhile, the aromatic polycarbonate resin has excellent cutting processability, but tends to have insufficient surface hardness. Therefore, use of a transparent multilayer film having the above layer configuration makes it possible to easily obtain an anti-glare hard coat laminated film having both excellent surface hardness and excellent cutting processability by compensating for the drawbacks of the two resins. In addition, in the transparent multilayer film having the above layer configuration, use of a poly(meth)acrylimide resin as an acrylic resin for the acrylic resin layers in particular makes it possible to easily obtain an anti-glare hard coat laminated film which is all excellent in heat resistance, surface hardness, and cutting processability.

The layer thickness of the $\alpha 1$ layer is not particularly limited, but may be usually 20 μm or more, preferably 40 μm or more, more preferably 60 μm or more, and still more preferably 80 µm or more from a viewpoint of surface hardness of the anti-glare hard coat laminated film according to at least one embodiment.

The layer thickness of the α2 layer is not particularly limited, but is preferably the same layer thickness as the α1 layer from a viewpoint of curling resistance of the anti-glare hard coat laminated film according to at least one embodiment.

"The same layer thickness" referred to herein should not be interpreted to be the same layer thickness in a physico-chemically strict sense of the word. It should be interpreted to be the same layer thickness within a variation in a process/quality control usually performed industrially. The reason is that curling resistance of a multilayer film can be kept good when the layer thicknesses are the same within a variation in a process/quality control usually performed industrially. An unstretched multilayer film obtained by a T-die co-extrusion method is usually subjected to a process/quality control within a variation of about −5 to +5 µm, and therefore the layer thickness of 65 µm and the layer thickness of 75 µm should be interpreted to be identical. "The same layer thickness" here can be paraphrased as "substantially the same layer thickness".

The layer thickness of the β layer is not particularly limited, but may be usually 20 µm or more, and preferably 80 µm or more from a viewpoint of cutting processability of the anti-glare hard coat laminated film according to at least one embodiment.

As an acrylic resin for the α1 layer and the α2 layer, those described above can be used.

For an acrylic resin used for the α1 layer and an acrylic resin used for the α2 layer, acrylic resins having different resin characteristics, for example, having different kinds, melt mass flow rates, or glass transition temperatures may be used. Acrylic resins having the same resin characteristic are preferably used from a viewpoint of curling resistance of the anti-glare hard coat laminated film according to at least one embodiment. Use of acrylic resins in the same grade and in the same lot is one of preferable embodiments, for example.

As the aromatic polycarbonate resin used for the β layer, for example, it is possible to use one kind or a mixture of two or more kinds of aromatic polycarbonate resins such as a polymer obtained by an interfacial polymerization method for an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate.

Preferable examples of optional components which can be contained in the aromatic polycarbonate resin include a core-shell rubber. By using the core-shell rubber in an amount of 0 to 30 parts by mass of (100 to 70 parts by mass of the aromatic polycarbonate resin), preferably in an amount of 0 to 10 parts by mass (100 to 90 parts by mass of the aromatic polycarbonate resin) relative to 100 parts by mass of the total amount of the aromatic polycarbonate resin and the core-shell rubber, cutting processability and impact resistance of the transparent resin film can be further enhanced.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. As the core-shell rubber, these compounds can be used singly or in a mixture of two or more kinds thereof.

The aromatic polycarbonate resin can further include, within a range not contrary to an object according to at least one embodiment, a thermoplastic resin other than the aromatic polycarbonate resin and the core-shell rubber; a pigment, an inorganic filler, an organic filler, and a resin filler; an additive such as a lubricant, an antioxidant, a weather resistance stabilizer, a heat stabilizer, a release agent, an antistatic agent, or a surfactant; or the like, as desired. The blending amount of the optional component(s) is usually about from 0.01 to 10 parts by mass relative to 100 parts by mass of the total amount of the aromatic polycarbonate resin and the core-shell rubber.

A method for manufacturing the transparent resin film is not particularly limited. When the transparent resin film is a poly(meth)acrylimide resin film, preferable examples of a method for manufacturing the poly(meth)acrylimide resin film include a method described in JP 2015-033844 A. When the transparent resin film is a transparent multilayer film obtained by sequentially laminating the first acrylic resin layer (α1), the aromatic polycarbonate resin layer (β), and the second acrylic resin layer (α2) directly in this order, preferable examples of a method for manufacturing the transparent multilayer film include a method described in JP 2015-083370 A. In forming a hard coat, a hard coat forming surface or both surfaces of the transparent resin film may be subjected to an adhesion-facilitating treatment such as a corona discharge treatment or anchor coat formation in advance in order to enhance adhesion strength to the hard coat.

The anti-glare hard coat laminated film according to at least one embodiment preferably includes, in order from a surface layer side, the first hard coat, the second hard coat, the transparent resin film layer, and a third hard coat. The third hard coat formed allows a force to curl the anti-glare hard coat laminated film in one direction (hereinafter, also abbreviated as a curling force) and a force to curl the anti-glare hard coat laminated film in another direction to work simultaneously. By allowing these two curling forces to be canceled to be zero, occurrence of curling can be suppressed.

In recent years, for the purpose of weight reduction of an image display apparatus, a touch panel having a bilayer structure in which a touch sensor is directly formed on a back side of a display face plate (so-called one-glass-solution) has been proposed. In addition, one-plastic-solution substituted for the so-called one-glass-solution has been also proposed for the purpose of further weight reduction. When the anti-glare hard coat laminated film according to at least one embodiment is used for the one-plastic-solution substituted for the so-called one-glass-solution, the third hard coat formed easily imparts characteristics suitable for a printed surface.

The components and the thickness of the third hard coat are not particularly limited as long as the two curling forces can be canceled. For the components and the thickness of the third hard coat, those described above for the second hard coat may be used.

The anti-glare hard coat laminated film according to at least one embodiment may include an optional layer(s) other than the first hard coat, the second hard coat, the transparent resin film layer, and the third hard coat, as desired. Examples of the optional layer include a hard coat other than the first to third hard coats, an anchor coat, a pressure-sensitive adhesive agent layer, a transparent conductive layer, a high refractive index layer, a low refractive index layer, and a reflection-preventive layer.

FIG. 1 is a conceptual cross-sectional view exemplifying the anti-glare hard coat laminated film according to at least one embodiment. This exemplary anti-glare hard coat laminated film sequentially includes, from a touch surface side, a first hard coat 1, a second hard coat 2, a first poly(meth) acrylimide resin layer (α1) 3, an aromatic polycarbonate resin layer (β) 4, a second poly(meth)acrylimide resin layer (α2) 5, and a third hard coat 6.

The anti-glare hard coat laminated film according to at least one embodiment has a total light transmission rate of preferably 85% or more, more preferably 88% or more, still more preferably 89% or more, most preferably 90% or more (measured with a turbidimeter "NDH 2000" (trade name) available from Nippon Denshoku Industries Co., Ltd. according to JIS K7361-1:1997). Due to the total light transmission rate of 85% or more, the anti-glare hard coat laminated film according to at least one embodiment can be suitably used as a member of an image display apparatus. A higher total light transmission rate is more preferable.

In the anti-glare hard coat laminated film according to at least one embodiment, a Y value of an XYZ color system based on a 2 degree visual field (measured under conditions of 5° specular reflection (a reflecting unit is disposed in front of an integrating sphere, and a value of specular reflection eliminating diffused light is obtained) using a spectrophotometer "SolidSpec-3700" (trade name) and a reflecting unit "absolute reflectance measuring apparatus incident angle 5°" (trade name) available from Shimadzu Corporation according to a manual of the spectrophotometer) is usually 4.2% or less, preferably 3.0% or less, and more preferably 2.8% or less from a viewpoint of an anti-glare property. At the same time, the Y value of the XYZ color system is usually 1.5% or more, and preferably 2.0% or more from a viewpoint of preventing a displayed image from becoming chalky. Furthermore, the Y value of the XYZ color system may be preferably 1.5% or more and 4.2% or less, and more preferably 1.5% or more and 3.0% or less, 1.5% or more and 2.8% or less, 2.0% or more and 4.2% or less, 2.0% or more and 3.0% or less, or 2.0% or more and 2.8% or less.

In the anti-glare hard coat laminated film according to at least one embodiment, the haze may be usually 3% or more, and preferably 5% or more (measured with a turbidimeter "NDH 2000" (trade name) available from Nippon Denshoku Industries Co., Ltd. according to JIS K7136:2000) from a viewpoint of an anti-glare property, although depending on the level of an anti-glare property to be imparted. At the same time, the haze may be usually 30% or less, and preferably 25% or less from a viewpoint of preventing a displayed image from becoming chalky. Furthermore, the haze may be preferably 3% or more and 30% or less, more preferably 3% or more and 25% or less, 5% or more and 30% or less, or 5% or more and 25% or less.

In the anti-glare hard coat laminated film according to at least one embodiment, the pencil hardness on the first hard coat surface is preferably 5 H or more, more preferably 6 H or more, and still more preferably 7 H or more (measured with a pencil "UNI" (trade name) available from Mitsubishi Pencil Co., Ltd. under a condition of a load of 750 g according to JIS K5600-5-4). Due to the pencil hardness of 5 H or more on the first hard coat surface, the anti-glare hard coat laminated film according to at least one embodiment can be suitably used as a member of an image display apparatus. A higher pencil hardness on the first hard coat surface is more preferable.

In the anti-glare hard coat laminated film according to at least one embodiment, preferably, the total light transmission rate is 85% or more, 88% or more, 89% or more, or 90% or more, the pencil hardness on the first hard coat surface is 5 H or more, 6 H or more, or 7 or more, and the Y value of the XYZ color system is 1.5% or more and 4.2% or less, 1.5% or more and 3.0% or less, 1.5% or more and 2.8% or less, 2.0% or more and 4.2% or less, 2.0% or more and 3.0% or less, or 2.0% or more and 2.8% or less. That is, any combination of the ranges of these three parameters (any "combination" as a mathematical term) is preferable. For example, preferably, the total light transmission rate is 88% or more, the pencil hardness on the first hard coat surface is 6 H or more, and the Y value of the XYZ color system is 1.5% or more and 3.0% or less. In addition, for example, preferably, the total light transmission rate is 89% or more, the pencil hardness on the first hard coat surface is 7 or more, and the Y value of the XYZ color system is 1.5% or more and 2.8% or less.

The anti-glare hard coat laminated film according to at least one embodiment has a minimum bending radius of preferably 40 mm or less, more preferably 35 mm or less, still more preferably 30 mm or less. Due to the minimum bending radius of 40 mm or less, the anti-glare hard coat laminated film according to at least one embodiment can be easily handled as a film roll, and this makes a manufacturing efficiency or the like advantageous. A smaller minimum bending radius is more preferable. Here, the minimum bending radius is a value measured according to a test (v) in Examples described below.

It should be noted that the minimum bending radius is a minimum radius capable of bending an anti-glare hard coat laminated film with no crack generated on a surface of a bent portion when the anti-glare hard coat laminated film is bent, and indicates a limit against bending. A bending radius is defined in a similar manner to a radius of curvature.

Figure 2:
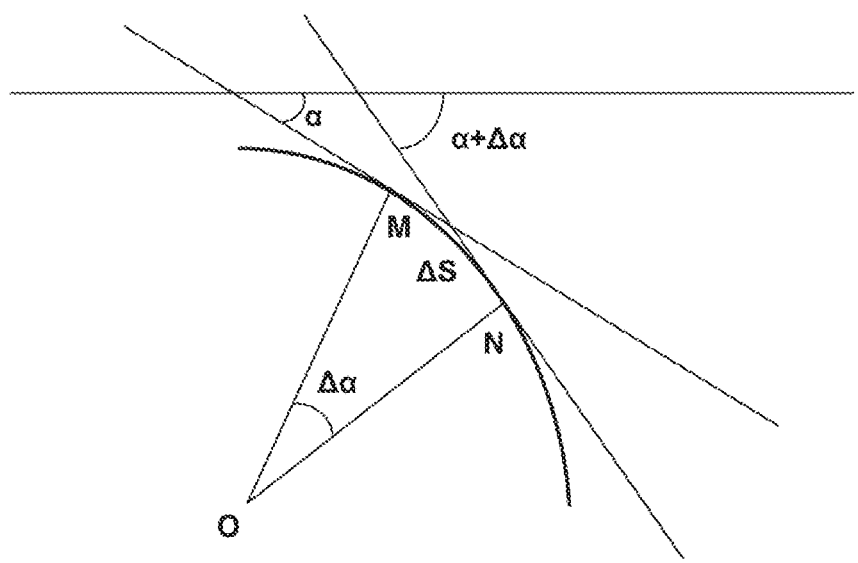
FIG. 2 is a diagram for describing a radius of curvature.

The radius of curvature is defined as follows with reference to FIG. 2. When a length from a point M to a point N in a curve is denoted as $\Delta S$; a difference between a slope of a tangent line at the point M and a slope of a tangent line at the point N is denoted as $\Delta \alpha$; and an intersection of a line which is perpendicular to the tangent line at the point M and intersects with the tangent line at the point M and a line which is perpendicular to the tangent line at the point N and intersects with the tangent line at the point N is denoted as O, in a case where $\Delta S$ is sufficiently small, a curve from the point M to the point N can be approximated to an arc (FIG. 2). The radius in this case is defined as the radius of curvature. Furthermore, when the radius of curvature is denoted as R, $\angle MON = \Delta \alpha$ is satisfied. In a case where $\Delta S$ is sufficiently small, Act is also sufficiently small, and therefore $\Delta S = R \Delta \alpha$ is satisfied. As a result, $R = \Delta S / \Delta \alpha$ is satisfied.

In the anti-glare hard coat laminated film according to at least one embodiment, the water contact angle at the first hard coat surface is preferably 100° or more, and more preferably 105° or more. When the anti-glare hard coat laminated film according to at least one embodiment is used as a member of a display apparatus having a touch panel function, the first hard coat normally forms a touch surface. Due to the water contact angle of 100° or more at the first hard coat surface, a touch panel can be operated by sliding a finger or a pen on a touch surface according to one's own will. A higher water contact angle is more preferable from a viewpoint of sliding a finger or a pen according to one's own will. The upper limit of the water contact angle is not particularly specified, but about 120° is usually sufficient from a viewpoint of finger slidability. Here, the water contact angle is a value measured according to a test (vi) in Examples described below.

In the anti-glare hard coat laminated film according to at least one embodiment, the water contact angle at the first hard coat surface after 7,500 reciprocating wipes with a cotton is preferably 100° or more. More preferably, the water contact angle after 10,000 reciprocating wipes with a cotton is 100° or more. Due to the water contact angle of 100° or more after 7,500 reciprocating wipes with a cotton, a surface characteristic such as finger slidability can be maintained even after repeated wipes with a handkerchief or the like. For the number of wipes with a cotton during which a water contact angle of 100° or more can be maintained, a larger number is more preferable. Here, the water contact angle after wipes with a cotton is a value measured according to a test (vii) in Examples described below.

In the anti-glare hard coat laminated film according to at least one embodiment, preferably, the total light transmission rate is 85% or more, 88% or more, 89% or more, or 90% or more, the pencil hardness on the first hard coat surface is 5 H or more, 6 H or more, or 7 H or more, the Y value of the XYZ color system is 1.5% or more and 4.2% or less, 1.5% or more and 3.0% or less, 1.5% or more and 2.8% or less, 2.0% or more and 4.2% or less, 2.0% or more and 3.0% or less, or 2.0% or more and 2.8% or less, and the minimum bending radius is 40 mm or less, 35 mm or less, or 30 mm or less. That is, any combination of the ranges of these four parameters (any "combination" as a mathematical term) is preferable. For example, preferably, the total light transmission rate is 88% or more, the pencil hardness on the first hard coat surface is 6 H or more, the Y value of the XYZ color system is 1.5% or more and 3.0% or less, and the minimum bending radius is 35 mm or less. In addition, for example, preferably, the total light transmission rate is 89% or more, the pencil hardness on the first hard coat surface is 7 H or more, the Y value of the XYZ color system is 1.5% or more and 2.8% or less, and the minimum bending radius is 30 mm or less.

In the anti-glare hard coat laminated film according to at least one embodiment, preferably, the total light transmission rate is 85% or more, 88% or more, 89% or more, or 90% or more, the pencil hardness on the first hard coat surface is 5 H or more, 6 H or more, or 7 H or more, the Y value of the XYZ color system is 1.5% or more and 4.2% or less, 1.5% or more and 3.0% or less, 1.5% or more and 2.8% or less, 2.0% or more and 4.2% or less, 2.0% or more and 3.0% or less, or 2.0% or more and 2.8% or less, and the water contact angle at the first hard coat surface after 7,500 reciprocating wipes with a cotton or after 10,000 reciprocating wipes with a cotton is 100° or more. That is, any combination of the ranges of these four parameters (any "combination" as a mathematical term) is preferable. For example, preferably, the total light transmission rate is 88% or more, the pencil hardness on the first hard coat surface is 6 H or more, the Y value of the XYZ color system is 1.5% or more and 3.0% or less, and the water contact angle after 10,000 reciprocating wipes with a cotton is 100° or more. In addition, for example, preferably, the total light transmission rate is 89% or more, the pencil hardness on the first hard coat surface is 7 H or more, the Y value of the XYZ color system is 1.5% or more and 2.8% or less, and the water contact angle after 10,000 reciprocating wipes with a cotton is 100° or more.

In the anti-glare hard coat laminated film according to at least one embodiment, preferably, the total light transmission rate is 85% or more, 88% or more, 89% or more, or 90% or more, the pencil hardness on the first hard coat surface is 5 H or more, 6 H or more, or 7 H or more, the Y value of the XYZ color system is 1.5% or more and 4.2% or less, 1.5% or more and 3.0% or less, 1.5% or more and 2.8% or less, 2.0% or more and 4.2% or less, 2.0% or more and 3.0% or less, or 2.0% or more and 2.8% or less, the minimum bending radius is 40 mm or less, 35 mm or less, or 30 mm or less, and the water contact angle at the first hard coat surface after 7,500 reciprocating wipes with a cotton or after 10,000 reciprocating wipes with a cotton is 100° or more. That is, any combination of the ranges of these five parameters (any "combination" as a mathematical term) is preferable. For example, when the total light transmission rate is 88% or more, the pencil hardness on the first hard coat surface is 6 H or more, the Y value of the XYZ color system is 1.5% or more and 3.0% or less, the minimum bending radius is 35 mm or less, and the water contact angle at the first hard coat surface after 10,000 reciprocating wipes with a cotton is 100° or more. In addition, for example, preferably, the total light transmission rate is 89% or more, the pencil hardness on the first hard coat surface is 7 H or more, the Y value of the XYZ color system is 1.5% or more and 2.8% or less, the minimum bending radius is 30 mm or less, and the water contact angle after 10,000 reciprocating wipes with a cotton is 100° or more.

The anti-glare hard coat laminated film according to at least one embodiment has a yellowness index (measured with a colorimeter "SolidSpec-3700" (trade name) available from Shimadzu Corporation according to JIS K7105:1981) of preferably 3 or less, more preferably 2 or less, still more preferably 1 or less. Due to the yellowness index of 3 or less, the anti-glare hard coat laminated film according to at least one embodiment can be suitably used as a member of an image display apparatus. A lower yellowness index is more preferable.

Manufacturing Method

A method for manufacturing the anti-glare hard coat laminated film according to at least one embodiment is not particularly limited, but any method can be used.

For example, from a viewpoint of adhesiveness between the first hard coat and the second hard coat, a preferable manufacturing method includes: (1) a step of forming a wet coat of the second hard coat forming coating material on the transparent resin film; (2) a step of irradiating the wet coat of the second hard coat forming coating material with an active energy ray at an integrated amount of light of 1 to 230 mJ/cm$^2$, preferably 5 to 200 mJ/cm$^2$, more preferably 10 to 160 mJ/cm$^2$, still more preferably 20 to 120 mJ/cm$^2$, most preferably 30 to 100 mJ/cm$^2$, and converting the wet coat of the second hard coat forming coating material into a coat in a set-to-touch state; (3) a step of forming a wet coat of the first hard coat forming coating material on the coat of the second hard coat forming coating material in a set-to-touch state; and (4) a step of preheating the wet coat of the first hard coat forming coating material to a temperature of 30 to 100° C., preferably 40 to 85° C., more preferably 50 to 75° C., and irradiating the wet coat with an active energy ray at an integrated amount of light of 240 to 10000 mJ/cm$^2$, preferably 320 to 5000 mJ/cm$^2$, more preferably 360 to 2000 mJ/cm$^2$.

In the step (1), a method for forming the wet coat of the second hard coat forming coating material is not particularly limited, but a known web applying method can be used. Examples of the web applying method include roll coating, gravure coating, reverse coating, roll brushing, spray coating, air knife coating, and die coating.

The wet coat of the second hard coat forming coating material formed in the step (1) is in a set-to-touch state or in a state with no tackiness in the step (2), causing no problem in handling such as sticking even in direct contact with a web apparatus. Therefore, in the subsequent step (3), a wet coat of the first hard coat forming coating material can be formed on the coat of the second hard coat forming coating material in a set-to-touch state.

It should be noted that here, the clause "a coat is in a set-to-touch state (in a state with no tackiness)" means that a coat is in a state in which, even when the coat directly comes into contact with a web apparatus, no problem in handling occurs.

Irradiation with an active energy ray in the step (2) is performed such that the integrated amount of light is usually 1 mJ/cm$^2$ or more, preferably 5 mJ/cm$^2$ or more, more preferably 10 mJ/cm$^2$ or more, still more preferably 20 mJ/cm$^2$ or more, and most preferably 30 mJ/cm$^2$ or more from a viewpoint of converting the coat into a coat in a set-to-touch state reliably, although depending on characteristics of a coating material used as the second hard coat forming coating material. At the same time, the irradiation is performed such that the integrated amount of light is usually 230 mJ/cm$^2$ or less, preferably 200 mJ/cm$^2$ or less, more preferably 160 mJ/cm$^2$ or less, still more preferably 120 mJ/cm$^2$ or less, and most preferably 100 mJ/cm$^2$ or less from a viewpoint of adhesiveness between the first hard coat and the second hard coat.

The wet coat of the second hard coat forming coating material is preferably predried before the irradiation with an active energy ray in the step (2). Predrying described above can be performed by causing a web to pass through a drying furnace set at a temperature of about 23 to 150° C., preferably 50 to 120° C. at a line speed such that the time required to pass from the inlet to the outlet is about from 0.5 to 10 minutes and preferably from 1 to 5 minutes, for example.

When the irradiation with an active energy ray is performed in the step (2), the wet coat of the second hard coat forming coating material may be preheated to a temperature of 40 to 120° C., preferably 70 to 100° C. This can convert the coat into a coat in a set-to-touch state reliably. A method for preheating described above is not particularly limited, but any method can be used. Specific examples of the method will be explained below in the description of the step (4).

In the step (3), a method for forming the wet coat of the first hard coat forming coating material is not particularly limited, but a known web applying method can be used. Examples of the web applying method include roll coating, gravure coating, reverse coating, roll brushing, spray coating, air knife coating, and die coating.

The wet coat of the first hard coat forming coating material formed in the step (3) is completely cured in the step (4). At the same time, the coat of the second hard coat forming coating material is also completely cured.

The above method can enhance adhesiveness between the first hard coat and the second hard coat, and without wishing to be bound by any theory it is presumed that the reason is that complete curing is simultaneously achieved for both the hard coats by limiting the integrated amount of light in irradiation with an active energy ray to an amount adequate to convert the coat into a coat in a set-to-touch state but inadequate to completely cure the coat in the step (2) and setting the integrated amount of light to an amount adequate to completely cure the coat in the step (4) for the first time.

The irradiation with an active energy ray in the step (4) is performed such that the integrated amount of light is 240 mJ/cm$^2$ or more, preferably 320 mJ/cm$^2$ or more, and more preferably 360 mJ/cm$^2$ or more from a viewpoint of completely curing the coat and adhesiveness between the first hard coat and the second hard coat. At the same time, the irradiation with an active energy ray is performed such that the integrated amount of light is 10000 mJ/cm$^2$ or less, preferably 5000 mJ/cm$^2$ or less, and more preferably 2000 mJ/cm$^2$ or less from a viewpoint of preventing yellowing of a hard coat laminated film obtained and cost.

The wet coat of the first hard coat forming coating material is preferably predried before the irradiation with an active energy ray in the step (4). Predrying described above can be performed by causing a web to pass through a drying furnace set at a temperature of about 23 to 150° C., preferably 50 to 120° C. at a line speed such that the time required to pass from the inlet to the outlet is about from 0.5 to 10 minutes and preferably from 1 to 5 minutes, for example.

Figure 3:
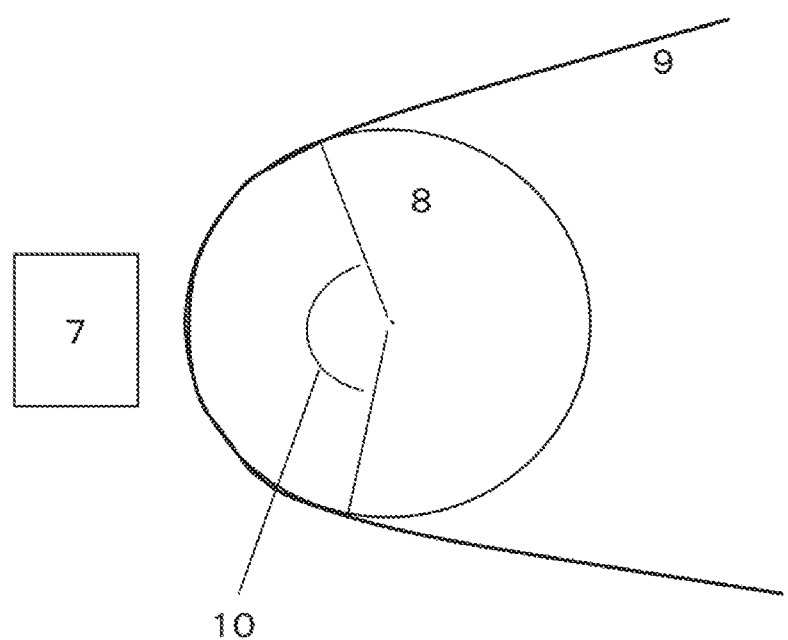
FIG. 3 is a conceptual diagram of an ultraviolet irradiator used in Examples.

When the irradiation with an active energy ray is performed in the step (4), the wet coat of the first hard coat forming coating material is favorably preheated to a temperature of 30 to 100° C., preferably 40 to 85° C., more preferably 50 to 75° C. from a viewpoint of obtaining good interlayer adhesion strength even when the first hard coat forming coating material and the second hard coat forming coating material have largely different characteristics from each other. A method for preheating described above is not particularly limited, but any method can be used. Examples thereof include a method in which a web 9 is held by a roll 8 disposed opposite to an active energy ray (ultraviolet ray) irradiator 7 as illustrated in FIG. 3 and a surface temperature of the roll is controlled to a predetermined temperature; a method in which a temperature in an irradiation furnace surrounding an active energy ray irradiator is controlled to a predetermined temperature; and a combination of these methods.

An aging treatment may be performed after the step (4). The aging treatment can stabilize characteristics of the anti-glare hard coat laminated film.

EXAMPLES

Hereinafter, the present invention will be described with reference to Examples, but the present invention is not limited thereto.

Measurement and Evaluation Method (i) Total Light Transmission Rate

The total light transmission rate of a hard coat laminated film was measured according to JIS K7361-1:1997 using a turbidimeter "NDH2000" (trade name) available from Nippon Denshoku Industries Co., Ltd.

(ii) Y Value of XYZ Color System Based on 2 Degree Visual Field

Using a spectrophotometer "SolidSpec-3700" (trade name) and a reflecting unit "absolute reflectance measuring apparatus incident angle 5°" (trade name) available from Shimadzu Corporation, the Y value of an XYZ color system of a hard coat laminated film was measured under a condition of 5° specular reflection (a reflecting unit was disposed in front of an integrating sphere) according to a manual of the spectrophotometer.

(iii) Haze

The haze of a hard coat laminated film was measured according to JIS K7136:2000 using a turbidimeter "NDH2000" (trade name) available from Nippon Denshoku Industries Co., Ltd.

(iv) Pencil Hardness

The pencil hardness of a first hard coat surface of an anti-glare hard coat laminated film was measured according to JIS K5600-5-4 using a pencil "UNI" (trade name) available from Mitsubishi Pencil Co., Ltd under a condition of a load of 750 g.

(v) Minimum Bending Radius

With reference to bending formability (B method) in JIS-K6902:2007, a test piece was conditioned at a temperature of 23° C.±2° C. and a relative humidity of 50±5% for 24 hours, and thereafter the test piece was bent at a bending temperature of 23° C.±2° C. at a bending line in a direction perpendicular to the machine direction of an anti-glare hard coat laminated film such that a first hard coat of the anti-glare hard coat laminated film was on the outer side to form a curved surface, and the minimum bending radius was measured. The radius of a front face having the smallest radius of a front face among shaping jigs with no crack generated was defined as the minimum bending radius. The "front face" has the same meaning as the term regarding a shaping jig in the B method defined in Paragraph 18.2 in JIS K6902:2007.

(vi) Water Contact Angle (Initial Water Contact Angle)

The water contact angle at a first hard coat surface of an anti-glare hard coat laminated film was measured by a method for calculating the water contact angle from a width and a height of a water droplet (see JIS R3257:1999) using an automatic contact angle meter "DSA20" (trade name) available from KRUSS GmbH.

(vii) Abrasion Resistance 1 (Water Contact Angle After Wipes with a Cotton)

A test piece was taken such that the size thereof was 150 mm in length and 50 mm in width and the machine direction of an anti-glare hard coat laminated film was in a longitudinal direction of the test piece. This test piece was placed on a Gakushin tester according to JIS L0849:2013 such that a first hard coat of the anti-glare hard coat laminated film was a front side. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze. The first hard coat surface of the test piece was rubbed reciprocatingly 10,000 times under conditions of a moving distance of the friction terminal of 60 mm and a speed of one reciprocation/sec. Thereafter, the water contact angle of the cotton-wiped portion was measured according to the method of the (vi). When the water contact angle was 100° or more, an operation of additionally performing 5,000 reciprocating rubs and then measuring the water contact angle of the cotton-wiped portion according to the method of the (vi) was repeated, and evaluation was performed according to the following criteria.

A: The water contact angle was 100° or more even after 10,000 reciprocating rubs.

B: The water contact angle was 100° or more after 7,500 reciprocating rubs, but the water contact angle was less than 100° after 10,000 reciprocating rubs.

C: The water contact angle was 100° or more after 5,000 reciprocating rubs, but the water contact angle was less than 100° after 7,500 reciprocating rubs.

D: The water contact angle was less than 100° after 5,000 reciprocating rubs.

(viii) Abrasion Resistance 2 (Steel Wool Resistance)

An anti-glare hard coat laminated film was placed on a Gakushin tester according to JIS L0849:2013 such that a first hard coat thereof was a front side. Subsequently, a steel wool of #0000 was attached to a friction terminal of the Gakushin tester, and a load of 500 g was then placed. A surface of the test piece was rubbed reciprocatingly 100 times, and then the rubbed portion was visually observed. When no scratch was observed, an operation of additionally performing 50 reciprocating rubs and then visually observing the rubbed portion was repeated, and evaluation was performed according to the following criteria.

A: No scratch was observed even after 200 reciprocating rubs.

B: No scratch was observed after 150 reciprocating rubs, but a scratch could be observed after 200 reciprocating rubs.

C: No scratch was observed after 100 reciprocating rubs, but a scratch could be observed after 150 reciprocating rubs.

D: A scratch could be observed after 100 reciprocating rubs.

(ix) Yellowness Index

The yellowness index of a hard coat laminated film was measured according to JIS K7105:1981 using a chromaticity meter "SolidSpec-3700" (trade name) available from Shimadzu Corporation.

(x) Surface Smoothness (Surface Appearance)

While surfaces (both surfaces) of an anti-glare hard coat laminated film were irradiated with light of a fluorescent lamp by changing an incident angle in various directions, the surfaces were visually observed, and surface smoothness (surface appearance) was evaluated according to the following criteria.

⊚ (very good): The surface had no undulation or scratch. Even when the surface was viewed closely by letting light pass therethrough, there was no unevenness or seeding.

○ (good): When the surface was viewed closely by letting light pass therethrough, the surface had a portion having unevenness. However, there was no undulation, scratch, or seeding.

Δ (slightly poor): When being viewed closely, the surface had slightly recognized undulations and scratches. The surface had unevenness and seeding.

× (poor): The surface had a large number of recognized undulations and scratches. The surface had obvious unevenness and seeding.

(xi) Square Lattice Pattern Test (Adhesiveness)

According to JIS K5600-5-6:1999, a square lattice pattern cut consisting of 100 cells (1 cell=1 mm×1 mm) was formed on an anti-glare hard coat laminated film from a first hard coat surface side. Thereafter, a tape for an adhesion test was pasted on the square lattice pattern, was rubbed with fingers, and was then peeled off. The criteria for evaluation were according to Table 1 in the above standard of JIS.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various parts of squares were peeled off partially or entirely. A cross-cut area of clearly more than 15% but not more than 35% was affected.

Classification 4: A coat was largely peeled off along edges of the cuts partially or entirely, and/or some parts of squares were peeled off partially or entirely. A cross-cut area of clearly more than 35% but not more than 65% was affected.

Classification 5: A case where the degree of peeling was more than that in Classification 4.

(xii) Cutting Processability (Condition of Curved Cutting-Processed Line)

A cut hole of a true circle with a diameter of 2 mm and a cut hole of a true circle with a diameter of 0.5 mm were formed in an anti-glare hard coat laminated film using a router processing machine automatically controlled by a computer. A mill used at this time was a four-bladed super-hard-alloy mill with nicks, having a cylindrically round tip, and a blade diameter was appropriately selected according to a portion to be processed. Subsequently, a cut edge surface of the cut hole with a diameter of 2 mm was observed visually or with a microscope (100 times), and evaluation was performed according to the following criteria. Similarly, a cut edge surface of the cut hole with a diameter of 0.5 mm was observed visually or with a microscope (100 times), and evaluation was performed according to the following criteria. Tables show the result of the former case and the result of the latter case in this order.

⊚ (very good): No crack or burr was observed even with a microscope.

○ (good): No crack was observed even with a microscope. However, a burr was observed.

Δ (Slightly poor): No crack was observed visually. However, a crack was observed with a microscope.

× (poor): A crack was observed even visually.

Raw Materials Used (A) Polyfunctional (meth)acrylate (A-1) Dipentaerythritol hexaacrylate (hexafunctional)

(A-2) Pentaerythritol triacrylate (trifunctional)

(B) Water Repellent (B-1) An acryloyl group—containing fluoropolyether water repellent "KY-1203" (trade name) available from Shin-Etsu Chemical Co., Ltd.: solid content 20% by mass (B-2) A methacryloyl group—containing fluoropolyether water repellent "FOMBLIN MT70" (trade name) available from Solvay S.A.: solid content 70% by mass (C) Silane Coupling Agent (C-1) N-2-(aminoethyl)-3-aminopropylmethyldimethoxysilane "KBM-602" (trade name) available from Shin-Etsu Chemical Co., Ltd.

(C-2) N-2-(aminoethyl)-3-aminopropyltrimethoxysilane "KBM-603" (trade name) available from Shin-Etsu Chemical Co., Ltd.

(C-3) 3-Aminopropyltrimethoxysilane "KBM-903" (trade name) available from Shin-Etsu Chemical Co., Ltd.

(C-4) 3-Mercaptopropylmethyldimethoxysilane "KBM-802" (trade name) available from Shin-Etsu Chemical Co., Ltd.

(C-5) 3-Glycidoxypropyltrimethoxysilane "KBM-403" (trade name) available from Shin-Etsu Chemical Co., Ltd.

(D) Resin Microparticles Having an Average Particle Diameter of 0.5 to 10 μm (D-1) Truly spherical silicone resin microparticles "Tospearl 120" (trade name) available from Momentive Performance Materials Corporation: average particle diameter 2 μm (D-2) Truly spherical silicone resin microparticles "Tospearl 130" (trade name) available from Momentive Performance Materials Corporation: average particle diameter 3 μm (D-3) Acrylic resin microparticles "MA-180TA" (trade name) available from Soken Chemical & Engineering Co., Ltd.: average particle diameter 1.8 μm (D-4) Acrylic resin microparticles "MX-80 H3wT" (trade name) available from Soken Chemical & Engineering Co., Ltd.: average particle diameter 0.5 μm (D-5) Acrylic resin microparticles "FH-S010" (trade name) available from Toyobo Co., Ltd.: average particle diameter 10 μm (D') Reference Microparticles (D'-1) Silica microparticles "SO-E6" (trade name) available from Admatex Corporation: average particle diameter 2 μm (E) Inorganic Microparticles Having an Average Particle Diameter of 1 to 300 nm (E-1) Silica microparticles which have been subjected to a surface treatment with a silane coupling agent having a vinyl group, and have an average particle diameter of 20 nm (F) Leveling Agent (F-1) A silicone-acrylate copolymer leveling agent "DISPARLON NSH-8430HF" (trade name) available from Kusumoto Chemicals, Ltd.: solid content 10% by mass (F-2) A silicone-acrylate copolymer leveling agent "BYK-3550" (trade name) available from BYK Japan KK: solid content 52% by mass (F-3) An acrylic polymer leveling agent "BYK-399" (trade name) available from BYK Japan KK: solid content 100% by mass (F-4) A silicone leveling agent "DISPARLON LS-480" (trade name) available from Kusumoto Chemicals, Ltd.: solid content 100% by mass (G) Optional Component (G-1) A phenyl ketone photopolymerization initiator (1-hydroxycyclohexyl phenyl ketone) "SB-PI714" (trade name) available from Shuang Bang Industrial Corp.

(G-2) 1-Methoxy-2-propanol (H1) First Hard Coat Forming Coating Material (H1-1) A first hard coat forming coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 2 parts by mass of the (D-1), 4 parts by mass of the (G-1), and 100 parts by mass of the (G-2). Table 1 is a table listing components and their blending amounts. As far as the (B-1) and the (B-2) are concerned, Table 1 shows values in terms of solid content.

(H1-2 to H1-27) First hard coat forming coating materials were obtained in a similar manner to the (H1-1) except that the components and blending amounts thereof were changed as shown in any one of Tables 1 to 3.

TABLE 1

| Component | First hard coat forming coating material | | | | | | | | |
|---|---|---|---|---|---|---|---|---|---|
| (part by mass) | H1-1 | H1-2 | H1-3 | H1-4 | H1-5 | H1-6 | H1-7 | H1-8 | H1-9 |
| A-1 | 100 | 100 | 100 | 100 | 100 | 100 | 100 | 100 | 100 |
| B-1 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 |

TABLE 1-continued

| Component (part by mass) | First hard coat forming coating material | | | | | | | | |
|---|---|---|---|---|---|---|---|---|---|
| | H1-1 | H1-2 | H1-3 | H1-4 | H1-5 | H1-6 | H1-7 | H1-8 | H1-9 |
| C-1 | 0.5 | 0.5 | 0.5 | 0.5 | 0.5 | 0.5 | 0.5 | 0.5 | 0.5 |
| C-2 | — | — | — | — | — | — | — | — | — |
| C-3 | — | — | — | — | — | — | — | — | — |
| C-4 | — | — | — | — | — | — | — | — | — |
| C-5 | — | — | — | — | — | — | — | — | — |
| D-1 | 2 | — | 0.4 | 0.9 | 4 | 8 | 15 | — | — |
| D-2 | — | — | — | — | — | — | — | 2 | — |
| D-3 | — | — | — | — | — | — | — | — | 2 |
| D-4 | — | — | — | — | — | — | — | — | — |
| D-5 | — | — | — | — | — | — | — | — | — |
| D'-1 | — | — | — | — | — | — | — | — | — |
| E-1 | — | — | — | — | — | — | — | — | — |
| G-1 | 4 | 4 | 4 | 4 | 4 | 4 | 4 | 4 | 4 |
| G-2 | 100 | 100 | 100 | 100 | 100 | 100 | 100 | 100 | 100 |

TABLE 2

| Component (part by mass) | First hard coat forming coating material | | | | | | | | |
|---|---|---|---|---|---|---|---|---|---|
| | H1-10 | H1-11 | H1-12 | H1-13 | H1-14 | H1-15 | H1-16 | H1-17 | H1-18 |
| A-1 | 100 | 100 | 100 | 100 | 100 | 100 | 100 | 100 | 100 |
| B-1 | 0.40 | 0.40 | 0.40 | — | 0.080 | 0.80 | 2.0 | 8.0 | 0.40 |
| B-2 | 0.042 | 0.042 | 0.042 | — | 0.0084 | 0.084 | 0.21 | 0.84 | 0.042 |
| C-1 | 0.5 | 0.5 | 0.5 | 0.5 | 0.5 | 0.5 | 0.5 | 0.5 | 0.5 |
| C-2 | — | — | — | — | — | — | — | — | — |
| C-3 | — | — | — | — | — | — | — | — | — |
| C-4 | — | — | — | — | — | — | — | — | — |
| C-5 | — | — | — | — | — | — | — | — | — |
| D-1 | — | — | — | 2 | 2 | 2 | 2 | 2 | 2 |
| D-2 | — | — | — | — | — | — | — | — | — |
| D-3 | — | — | — | — | — | — | — | — | — |
| D-4 | 2 | — | — | — | — | — | — | — | — |
| D-5 | — | 2 | — | — | — | — | — | — | — |
| D'-1 | — | — | 2 | — | — | — | — | — | — |
| E-1 | — | — | — | — | — | — | — | — | 20 |
| G-1 | 4 | 4 | 4 | 4 | 4 | 4 | 4 | 4 | 4 |
| G-2 | 100 | 100 | 100 | 100 | 100 | 100 | 100 | 80 | 130 |

TABLE 3

| Component (part by mass) | First hard coat forming coating material | | | | | | | | |
|---|---|---|---|---|---|---|---|---|---|
| | H1-19 | H1-20 | H1-21 | H1-22 | H1-23 | H1-24 | H1-25 | H1-26 | H1-27 |
| A-1 | 100 | 100 | 100 | 100 | 100 | 100 | 100 | 100 | 100 |
| B-1 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 |
| C-1 | — | 0.01 | 0.1 | 1 | 5 | — | — | — | — |
| C-2 | — | — | — | — | — | 0.5 | — | — | — |
| C-3 | — | — | — | — | — | — | 0.5 | — | — |
| C-4 | — | — | — | — | — | — | — | 0.5 | — |
| C-5 | — | — | — | — | — | — | — | — | 0.5 |
| D-1 | 2 | 2 | 2 | 2 | 2 | 2 | 2 | 2 | 2 |
| D-2 | — | — | — | — | — | — | — | — | — |
| D-3 | — | — | — | — | — | — | — | — | — |
| D-4 | — | — | — | — | — | — | — | — | — |
| D-5 | — | — | — | — | — | — | — | — | — |
| D'-1 | — | — | — | — | — | — | — | — | — |
| E-1 | — | — | — | — | — | — | — | — | — |
| G-1 | 4 | 4 | 4 | 4 | 4 | 4 | 4 | 4 | 4 |
| G-2 | 100 | 100 | 100 | 100 | 105 | 100 | 100 | 100 | 100 |

(H2) Second Hard Coat Forming Coating Material (H2-1) A second hard coat forming coating material was obtained by mixing and stirring 100 parts by mass of the (A-2), 140 parts by mass of the (E-1), 2 parts by mass (0.2 parts by mass in terms of solid content) of the (F-1), 17 parts by mass of the (G-1), and 200 parts by mass of the (G-2). Table 4 is a table listing components and their blending amounts. As far as the (F-1) is concerned, Table 4 shows a value in terms of solid content.

(H2-2 to H2-14) A second hard coat forming coating material was obtained in a similar manner to the (H2-1) except that the components and blending amounts thereof were changed as shown in Table 4 or 5. As far as the (F-2) as well as the (F-1) is concerned, Table 4 or 5 also shows values in terms of solid content.

TABLE 4

| Component (part by mass) | Second hard coat forming coating material | | | | | | |
|---|---|---|---|---|---|---|---|
| | H2-1 | H2-2 | H2-3 | H2-4 | H2-5 | H2-6 | H2-7 |
| A-2 | 100 | 100 | 100 | 100 | 100 | 100 | 100 |
| E-1 | 140 | 140 | 140 | 140 | 140 | 140 | 140 |
| F-1 | 0.2 | — | 0.1 | 0.4 | 0.6 | 1.5 | — |
| F-2 | — | — | — | — | — | — | 0.2 |
| F-3 | — | — | — | — | — | — | — |
| F-4 | — | — | — | — | — | — | — |
| G-1 | 17 | 17 | 17 | 17 | 17 | 17 | 17 |
| G-2 | 200 | 200 | 200 | 200 | 200 | 200 | 200 |

TABLE 5

| Component (part by mass) | Second hard coat forming coating material | | | | | | |
|---|---|---|---|---|---|---|---|
| | H2-8 | H2-9 | H2-10 | H2-11 | H2-12 | H2-13 | H2-14 |
| A-2 | 100 | 100 | 100 | 100 | 100 | 100 | 100 |
| E-1 | 140 | 140 | 140 | 80 | 200 | 30 | 400 |
| F-1 | — | — | — | 0.2 | 0.2 | 0.2 | 0.2 |
| F-2 | 0.4 | — | — | — | — | — | — |
| F-3 | — | 0.3 | — | — | — | — | — |
| F-4 | — | — | 0.3 | — | — | — | — |
| G-1 | 17 | 17 | 17 | 17 | 17 | 17 | 17 |
| G-2 | 200 | 200 | 200 | 155 | 250 | 120 | 420 |

Figure 4:
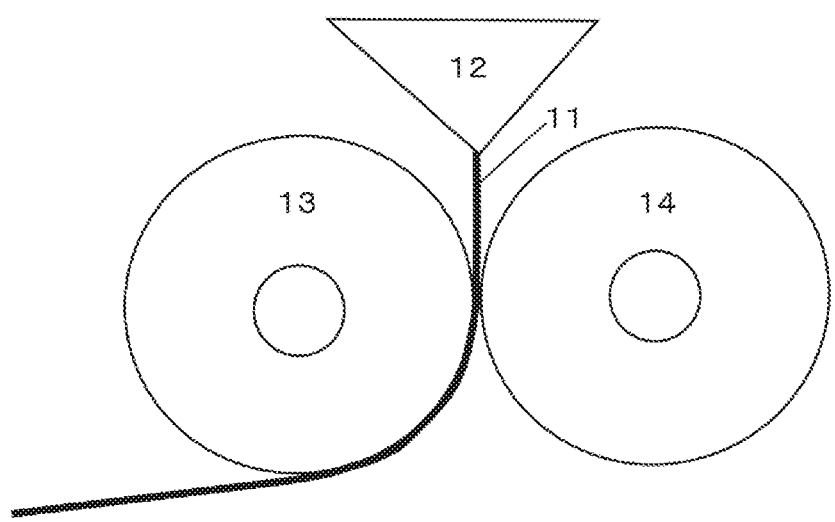
FIG. 4 is a conceptual diagram of a film forming apparatus used in Examples.

(P) Transparent Resin Film (P-1) Using an apparatus equipped with a two-kind/three-layer multimanifold-type co-extrusion T-die 12 and a winder having a mechanism for pressing a melted resin film 11 with a first mirror-finished roll 13 (i.e. a roll to hold a melted film and send the melted film to a subsequent transfer roll) and a second mirror-finished roll 14 (see FIG. 4), a two-kind/three-layer multilayer resin film in which both outer layers (α1 layer and α2 layer) were formed of a poly(meth)acrylimide "PLEXIMID TT50" (trade name) available from Evonik Industries AG and an intermediate layer (β layer) was formed of an aromatic polycarbonate "CALIBRE 301-4" (trade name) available from Sumika Styron Polycarbonate Limited was continuously co-extruded from the co-extrusion T-die 12. This co-extruded product was supplied and introduced between the rotating first mirror-finished roll 13 and second mirror-finished roll 14 such that the α1 layer was on the first mirror-finished roll side, and was pressed to obtain a transparent resin film having a total thickness of 250 μm, a layer thickness of the α1 layer of 80 μm, a layer thickness of the β layer of 90 μm, and a layer thickness of the α2 layer of 80 μm. As setting conditions at this time, a set temperature of the co-extrusion T-die 12 was 300° C., a set temperature of the first mirror-finished roll 13 was 130° C., a set temperature of the second mirror-finished roll 14 was 120° C., and a wind-up speed was 6.5 m/min (P-2) A transparent resin film was obtained in a similar manner to the (P-1) except that an acrylic resin "Optimas7500FS" (trade name) available from Mitsubishi Gas Chemical Company, Inc. was used in place of the "PLEXIMIDTT 50" (trade name).

(P-3) A transparent resin film was obtained in a similar manner to the (P-1) except that the layer thickness of the α1 layer, the layer thickness of the β layer, and the layer thickness of the α2 layer were changed to 60 μm, 130 μm, and 60 μm, respectively.

(P-4) A transparent resin film was obtained in a similar manner to the (P-1) except that the layer thickness of the α1 layer, the layer thickness of the β layer, and the layer thickness of the α2 layer were changed to 40 μm, 170 μm, and 40 μm, respectively.

(P-5) A biaxially stretched polyethylene terephthalate film "DIAFOIL" (trade name) available from Mitsubishi Plastics, Inc.: thickness 250 μm (P-6) An acrylic resin film "TECHNOLLOY S001G" (trade name) available from Sumitomo Chemical Co., Ltd.: thickness 250 μm.

(P-7) Using an apparatus equipped with a monolayer T-die and a winder having a mechanism for pressing a melted film with a first mirror-finished roll (i.e. a roll to hold a melted film and send the melted film to a subsequent transfer roll) and a second mirror-finished roll, an aromatic polycarbonate "CALIBRE 301-4" (trade name) available from Sumika Styron Polycarbonate Limited was continuously extruded from the T-die, was supplied and introduced between the rotating first mirror-finished roll and second mirror-finished roll, and was pressed to obtain a transparent resin film having a total thickness of 250 μm. As setting conditions at this time, a set temperature of the T-die was 320° C., a set temperature of the first mirror-finished roll was 140° C., a set temperature of the second mirror-finished roll was 120° C., and a wind-up speed was 5.6 m/min

EXAMPLE 1

Both surfaces of the (P-1) were subjected to a corona discharge treatment. Both surfaces had a wetting index of 64 mN/m. Subsequently, the (H2-1) was applied onto a surface on a side of the α1 layer using a die-type applicator such that the wet thickness was 40 μm (thickness after curing 22 μm). Subsequently, the film with the wet coat of the (H2-1) was caused to pass through a drying furnace set at an inner temperature of 90° C. at a line speed such that the time required to pass from the inlet to the outlet was 1 minute. Thereafter, the preheated film was treated using a curing apparatus having a high-pressure mercury lamp type ultraviolet irradiator 7 and a mirror-finished metal roll 8 having a diameter of 25.4 cm disposed opposite to each other (see FIG. 3) under conditions of a temperature of the mirror-finished metal roll 8 of 90° C. and an integrated amount of light of 80 mJ/cm$^2$. In FIG. 3, the reference numeral 9 indicates a web, and the reference numeral 10 indicates a holding angle. The wet coat of the (H2-1) became a coat in a set-to-touch state. Subsequently, the (H1-1) was applied onto the coat of the (H2-1) in a set-to-touch state using a die-type applicator such that the wet thickness was 4 μm (thickness after curing 2 μm). Subsequently, the film with the wet coat of the (H1-1) was caused to pass through a drying furnace set at an inner temperature of 80° C. at a line speed such that the time required to pass from the inlet to the outlet was 1 minute. Thereafter, the resulting product was treated using a curing apparatus having a high-pressure mercury lamp type ultraviolet irradiator 7 and a mirror-finished metal roll 8 having a diameter of 25.4 cm disposed opposite to each other (see FIG. 3) under conditions of a temperature of the mirror-finished metal roll 8 of 60° C. and an integrated amount of light of 480 mJ/cm² to obtain a first hard coat and a second hard coat. Subsequently, a third hard coat was formed on a surface on a side of the α2 layer with the same coating material as the one used for forming the second hard coat (the (H2-1) in Example 1) using a die-type applicator such that the thickness after curing was 22 μm to obtain a hard coat laminated film. This hard coat laminated film was subjected to the above tests (i) to (xii) for measurement and evaluation of physical properties thereof. Table 6 shows results thereof.

EXAMPLES 2 to 27

A hard coat laminated film was produced, and measurement and evaluation of physical properties thereof were performed in a similar manner to Example 1 except that a first hard coat forming coating material shown in any one of Tables 6 to 9 was used in place of the (H1-1). Tables 6 to 9 each show results thereof.

EXAMPLES 28 to 40

A hard coat laminated film was produced, and measurement and evaluation of physical properties thereof were performed in a similar manner to Example 1 except that a second hard coat forming coating material shown in any one of Tables 10 to 12 was used in place of the (H2-1). Tables 10 to 12 each show results thereof.

EXAMPLES 41 to 45

A hard coat laminated film was produced, and measurement and evaluation of physical properties thereof were performed in a similar manner to Example 1 except that a transparent resin film shown in Table 12 was used in place of the (P-1). Table 12 shows results thereof.

EXAMPLES 46 to 49

A hard coat laminated film was produced, and measurement and evaluation of physical properties thereof were performed in a similar manner to Example 1 except that the thickness of the first hard coat after curing was changed as shown in Table 13. Table 13 shows results thereof.

EXAMPLES 50 to 53

A hard coat laminated film was produced, and measurement and evaluation of physical properties thereof were performed in a similar manner to Example 1 except that the thickness of the second hard coat after curing was changed as shown in Table 13 or 14 and that the thickness of the third hard coat after curing was changed so as to be the same as the thickness of the second hard coat after curing. Tables 13 and 14 each show results thereof. In these Tables, "HC" is an abbreviation for hard coat.

EXAMPLES 54 to 68

A hard coat laminated film was produced, and measurement and evaluation of physical properties thereof were performed in a similar manner to Example 1 except that the manufacturing conditions of the hard coat laminated film were changed as shown in any one of Tables 14 to 16. Tables 14 to 16 each show results thereof. In these Tables, "HC" is an abbreviation for hard coat.

TABLE 6

| | | Example 1 | Example 2 | Example 3 | Example 4 | Example 5 | Example 6 | Example 7 |
|---|---|---|---|---|---|---|---|---|
| Composition | First hard coat coating material | H1-1 | H1-2 | H1-3 | H1-4 | H1-5 | H1-6 | H1-7 |
| | Second hard coat coating material | H2-1 | H2-1 | H2-1 | H2-1 | H2-1 | H2-1 | H2-1 |
| | Transparent resin film | P-1 | P-1 | P-1 | P-1 | P-1 | P-1 | P-1 |
| Evaluation results | Total light transmission rate % | 90.0 | 90.9 | 90.4 | 90.1 | 88.4 | 88.1 | 85.1 |
| | Y value of XYZ color system % | 2.6 | 4.6 | 4.1 | 3.1 | 1.8 | 1.6 | 1.4 |
| | Haze % | 7.5 | 0.2 | 1.4 | 3.0 | 14.5 | 21.7 | 35.2 |
| | Pencil hardness | 7H | 7H | 7H | 7H | 7H | 7H | 7H |
| | Minimum bending radius mm | 30 | 30 | 30 | 30 | 30 | 30 | 40 |
| | Water contact angle deg | 115 | 116 | 115 | 113 | 114 | 114 | 111 |
| | Abrasion resistance 1 | A | A | B | A | A | A | A |
| | Abrasion resistance 2 | A | A | A | A | B | C | D |
| | Yellowness index | 0.2 | 0.2 | 0.2 | 0.2 | 0.2 | 0.2 | 0.2 |
| | Surface smoothness | ◎ | ◎ | ◎ | ◎ | ◎ | ◎ | ◎ |
| | Square lattice pattern test | Classification 0 | Classification 0 | Classification 0 | Classification 0 | Classification 0 | Classification 0 | Classification 0 |
| | Cutting processability | ◎-◎ | ◎-◎ | ◎-◎ | ◎-◎ | ◎-◎ | ◎-◎ | ◎-◎ |

TABLE 7

|  |  | Example 8 | Example 9 | Example 10 | Example 11 | Example 12 | Example 13 | Example 14 |
|---|---|---|---|---|---|---|---|---|
| Composition | First hard coat coating material | H1-8 | H1-9 | H1-10 | H1-11 | H1-12 | H1-13 | H1-14 |
|  | Second hard coat coating material | H2-1 | H2-1 | H2-1 | H2-1 | H2-1 | H2-1 | H2-1 |
|  | Transparent resin film | P-1 | P-1 | P-1 | P-1 | P-1 | P-1 | P-1 |
| Evaluation results | Total light transmission rate % | 89.5 | 88.5 | 89.9 | 89.7 | 89.6 | 90.0 | 90.0 |
|  | Y value of XYZ color system % | 2.5 | 3.2 | 4.0 | 3.5 | 3.0 | 2.6 | 2.6 |
|  | Haze % | 8.2 | 5.8 | 3.2 | 5.4 | 7.8 | 7.5 | 7.5 |
|  | Pencil hardness | 7H | 6H | 6H | 5H | 6H | 5H | 7H |
|  | Minimum bending radius mm | 30 | 30 | 30 | 30 | 30 | 30 | 30 |
|  | Water contact angle deg | 111 | 112 | 114 | 113 | 113 | 70 | 113 |
|  | Abrasion resistance 1 | A | B | B | B | D | D | B |
|  | Abrasion resistance 2 | A | A | A | A | C | D | A |
|  | Yellowness index | 0.2 | 0.2 | 0.2 | 0.2 | 0.2 | 0.2 | 0.2 |
|  | Surface smoothness | ◎ | ◎ | ◎ | ○ | ◎ | ◎ | ◎ |
|  | Square lattice pattern test | Classification 0 | Classification 0 | Classification 0 | Classification 0 | Classification 0 | Classification 0 | Classification 0 |
|  | Cutting processability | ◎-◯ | ◎-◯ | ◎-◯ | ◎-◯ | ◎-◯ | ◎-◯ | ◎-◯ |

TABLE 8

|  |  | Example 15 | Example 16 | Example 17 | Example 18 | Example 19 | Example 20 | Example 21 |
|---|---|---|---|---|---|---|---|---|
| Composition | First hard coat coating material | H1-15 | H1-16 | H1-17 | H1-18 | H1-19 | H1-20 | H1-21 |
|  | Second hard coat coating material | H2-1 | H2-1 | H2-1 | H2-1 | H2-1 | H2-1 | H2-1 |
|  | Transparent resin film | P-1 | P-1 | P-1 | P-1 | P-1 | P-1 | P-1 |
| Evaluation results | Total light transmission rate % | 89.9 | 89.5 | 88.9 | 89.2 | 90.0 | 90.0 | 90.0 |
|  | Y value of XYZ color system % | 2.6 | 2.6 | 2.6 | 2.6 | 2.6 | 2.6 | 2.6 |
|  | Haze % | 7.7 | 8.7 | 10.9 | 7.7 | 7.6 | 7.6 | 7.6 |
|  | Pencil hardness | 7H | 7H | 7H | 7H | 7H | 7H | 7H |
|  | Minimum bending radius mm | 30 | 30 | 30 | 30 | 30 | 30 | 30 |
|  | Water contact angle deg | 114 | 116 | 117 | 116 | 116 | 116 | 116 |
|  | Abrasion resistance 1 | A | A | A | D | A | A | A |
|  | Abrasion resistance 2 | A | A | A | D | A | A | A |
|  | Yellowness index | 0.2 | 0.2 | 0.2 | 0.2 | 0.2 | 0.2 | 0.2 |
|  | Surface smoothness | ◎ | ◎ | ◎ | ◎ | ◎ | ◎ | ◎ |
|  | Square lattice pattern test | Classification 0 | Classification 0 | Classification 0 | Classification 0 | Classification 4 | Classification 1 | Classification 0 |
|  | Cutting processability | ◎-◯ | ◎-◯ | ◎-◯ | ◎-◯ | ◎-◯ | ◎-◯ | ◎-◯ |

TABLE 9

|  |  | Example 22 | Example 23 | Example 24 | Example 25 | Example 26 | Example 27 |
|---|---|---|---|---|---|---|---|
| Composition | First hard coat coating material | H1-15 | H1-16 | H1-17 | H1-18 | H1-19 | H1-20 |
|  | Second hard coat coating material | H2-1 | H2-1 | H2-1 | H2-1 | H2-1 | H2-1 |
|  | Transparent resin film | P-1 | P-1 | P-1 | P-1 | P-1 | P-1 |

TABLE 9-continued

|  |  | Example 22 | Example 23 | Example 24 | Example 25 | Example 26 | Example 27 |
|---|---|---|---|---|---|---|---|
| Evaluation results | Total light transmission rate % | 90.0 | 90.0 | 90.0 | 90.0 | 90.0 | 90.0 |
|  | Y value of XYZ color system % | 2.6 | 2.6 | 2.6 | 2.6 | 2.6 | 2.6 |
|  | Haze % | 7.6 | 7.6 | 7.6 | 7.6 | 7.6 | 7.6 |
|  | Pencil hardness | 7H | 7H | 7H | 7H | 7H | 7H |
|  | Minimum bending radius mm | 30 | 30 | 30 | 30 | 30 | 20 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.2 | 0.2 |
|  | Surface smoothness | ◎ | ◎ | ◎ | ◎ | ◎ | ◎ |
|  | Square lattice pattern test | Classification 0 | Classification 0 | Classification 0 | Classification 0 | Classification 0 | Classification 3 |
|  | Cutting processability | ◎-○ | ◎-○ | ◎-○ | ◎-○ | ◎-○ | ◎-○ |

TABLE 10

|  |  | Example 28 | Example 29 | Example 30 | Example 31 | Example 32 | Example 33 |
|---|---|---|---|---|---|---|---|
| Composition | First hard coat coating material | H1-1 | H1-1 | H1-1 | H1-1 | H1-1 | H1-1 |
|  | Second hard coat coating material | H2-2 | H2-3 | H2-4 | H2-5 | H2-6 | H2-7 |
|  | Transparent resin film | P-1 | P-1 | P-1 | P-1 | P-1 | P-1 |
| Evaluation results | Total light transmission rate % | 90.0 | 90.0 | 90.0 | 90.0 | 90.0 | 90.0 |
|  | Y value of XYZ color system % | 2.6 | 2.6 | 2.6 | 2.6 | 2.6 | 2.6 |
|  | Haze % | 7.7 | 7.6 | 7.6 | 7.6 | 7.9 | 7.6 |
|  | Pencil hardness | 7H | 7H | 7H | 7H | 7H | 7H |
|  | Minimum bending radius mm | 30 | 30 | 30 | 30 | 30 | 30 |
|  | Water contact angle deg | 116 | 116 | 116 | 116 | 116 | 116 |
|  | Abrasion resistance 1 | B | A | A | A | A | A |
|  | Abrasion resistance 2 | B | A | A | A | A | A |
|  | Yellowness index | 0.2 | 0.2 | 0.2 | 0.2 | 0.2 | 0.2 |
|  | Surface smoothness | ○ | ○ | ◎ | ◎ | ◎ | ◎ |
|  | Square lattice pattern test | Classification 0 | Classification 0 | Classification 0 | Classification 0 | Classification 2 | Classification 0 |
|  | Cutting processability | ◎-○ | ◎-○ | ◎-○ | ◎-○ | ◎-○ | ◎-○ |

TABLE 11

|  |  | Example 34 | Example 35 | Example 36 | Example 37 | Example 38 | Example 39 |
|---|---|---|---|---|---|---|---|
| Composition | First hard coat coating material | H1-1 | H1-1 | H1-1 | H1-1 | H1-1 | H1-1 |
|  | Second hard coat coating material | H2-8 | H2-9 | H2-10 | H2-11 | H2-12 | H2-13 |
|  | Transparent resin film | P-1 | P-1 | P-1 | P-1 | P-1 | P-1 |
| Evaluation results | Total light transmission rate % | 90.0 | 90.0 | 90.0 | 90.2 | 89.1 | 90.2 |
|  | Y value of XYZ color system % | 2.6 | 2.6 | 2.6 | 2.6 | 2.6 | 2.6 |
|  | Haze % | 7.6 | 7.9 | 7.9 | 7.6 | 8.0 | 7.5 |
|  | Pencil hardness | 7H | 7H | 7H | 6H | 8H | 3H |
|  | Minimum bending radius mm | 30 | 30 | 30 | 20 | 40 | 20 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.2 | 0.2 |
|  | Surface smoothness | ◎ | ○ | ◎ | ◎ | ◎ | ◎ |
|  | Square lattice pattern test | Classification 0 | Classification 0 | Classification 2 | Classification 0 | Classification 0 | Classification 0 |
|  | Cutting processability | ◎-○ | ◎-○ | ◎-○ | ◎-○ | ◎-○ | ◎-○ |

TABLE 12

|  |  | Example 40 | Example 41 | Example 42 | Example 43 | Example 44 | Example 45 |
|---|---|---|---|---|---|---|---|
| Composition | First hard coat coating material | H1-1 | H1-1 | H1-1 | H1-1 | H1-1 | H1-1 |
|  | Second hard coat coating material | H2-14 | H2-1 | H2-1 | H2-1 | H2-1 | H2-1 |
|  | Transparent resin film | P-1 | P-2 | P-3 | P-4 | P-5 | P-6 |
| Evaluation results | Total light transmission rate % | 87.1 | 90.0 | 90.0 | 90.0 | 89.2 | 89.7 |
|  | Y value of XYZ color system % | 2.6 | 2.6 | 2.6 | 2.6 | 2.6 | 2.6 |
|  | Haze % | 10.9 | 7.6 | 7.6 | 7.6 | 7.7 | 7.7 |
|  | Pencil hardness | 9H | 7H | 7H | 5H | 4H | 2H |
|  | Minimum bending radius mm | 50 | 30 | 30 | 30 | 30 | 30 |

TABLE 12-continued

|  | | Example 40 | Example 41 | Example 42 | Example 43 | Example 44 | Example 45 |
|---|---|---|---|---|---|---|---|
|  | Water contact angle deg | 116 | 117 | 116 | 116 | 116 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.3 | 0.2 |
|  | Surface smoothness | ◎ | ◎ | ◎ | ◎ | ◎ | ◎ |
|  | Square lattice pattern test | Classification 0 | Classification 0 | Classification 0 | Classification 0 | Classification 0 | Classification 0 |
|  | Cutting processability | ◎-○ | ◎-○ | ◎-○ | ◎-○ | ◎-○ | ◎-○ |

TABLE 13

|  | | Example 46 | Example 47 | Example 48 | Example 49 | Example 50 | Example 51 |
|---|---|---|---|---|---|---|---|
| First HC | Coating material | H1-1 | H1-1 | H1-1 | H1-1 | H1-1 | H1-1 |
|  | Thickness μm | 0.5 | 1 | 3 | 5 | 2 | 2 |
|  | Preheating for irradiation ° C. | 60 | 60 | 60 | 60 | 60 | 60 |
|  | Integrated amount of light mJ/cm² | 480 | 480 | 480 | 480 | 480 | 480 |
| Second HC | Coating material | H2-1 | H2-1 | H2-1 | H2-1 | H2-1 | H2-1 |
|  | Thickness μm | 22 | 22 | 22 | 22 | 15 | 18 |
|  | Preheating for irradiation ° C. | 90 | 90 | 90 | 90 | 90 | 90 |
|  | Integrated amount of light mJ/cm² | 80 | 80 | 80 | 80 | 80 | 80 |
| Evaluation results | Total light transmission rate % | 89.5 | 89.6 | 90.4 | 90.8 | 90.2 | 89.9 |
|  | Y value of XYZ color system % | 2.0 | 2.3 | 3.4 | 4.3 | 2.6 | 2.6 |
|  | Haze % | 7.9 | 7.7 | 7.4 | 8.2 | 7.7 | 7.7 |
|  | Pencil hardness | 4H | 5H | 7H | 7H | 5H | 7H |
|  | Minimum bending radius mm | 30 | 30 | 40 | 50 | 20 | 30 |
|  | Water contact angle deg | 114 | 115 | 114 | 115 | 116 | 116 |
|  | Abrasion resistance 1 | C | B | A | A | A | A |
|  | Abrasion resistance 2 | B | A | A | A | A | A |
|  | Yellowness index | 0.2 | 0.2 | 0.2 | 0.2 | 0.2 | 0.2 |
|  | Surface smoothness | ○ | ◎ | ◎ | ◎ | ◎ | ◎ |
|  | Square lattice pattern test | Classification 0 | Classification 0 | Classification 0 | Classification 0 | Classification 0 | Classification 0 |
|  | Cutting processability | ◎-○ | ◎-○ | ◎-○ | ◎-○ | ◎-○ | ◎-○ |

TABLE 14

|  | | Example 52 | Example 53 | Example 54 | Example 1 | Example 55 | Example 56 |
|---|---|---|---|---|---|---|---|
| First HC | Coating material | H1-1 | H1-1 | H1-1 | H1-1 | H1-1 | H1-1 |
|  | Thickness μm | 2 | 2 | 2 | 2 | 2 | 2 |
|  | Preheating for irradiation ° C. | 60 | 60 | 60 | 60 | 60 | 60 |
|  | Integrated amount of light mJ/cm² | 480 | 480 | 480 | 480 | 480 | 480 |
| Second HC | Coating material | H2-1 | H2-1 | H2-1 | H2-1 | H2-1 | H2-1 |
|  | Thickness μm | 25 | 35 | 22 | 22 | 22 | 22 |
|  | Preheating for irradiation ° C. | 90 | 90 | 90 | 90 | 90 | 90 |
|  | Integrated amount of light mJ/cm² | 80 | 80 | 30 | 80 | 120 | 160 |
| Evaluation results | Total light transmission rate % | 89.6 | 89.1 | 90.0 | 90.0 | 90.0 | 90.0 |
|  | Y value of XYZ color system % | 2.6 | 2.6 | 2.6 | 2.6 | 2.6 | 2.6 |
|  | Haze % | 7.7 | 7.7 | 7.5 | 7.5 | 7.5 | 7.5 |
|  | Pencil hardness | 7H | 9H | 7H | 7H | 7H | 7H |
|  | Minimum bending radius mm | 35 | 70 | 30 | 30 | 30 | 30 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.2 | 0.2 |
|  | Surface smoothness | ◎ | ◎ | ◎ | ◎ | ◎ | ◎ |
|  | Square lattice pattern test | Classification 0 | Classification 0 | Classification 0 | Classification 0 | Classification 0 | Classification 1 |
|  | Cutting processability | ◎-○ | ◎-○ | ◎-○ | ◎-○ | ◎-○ | ◎-○ |

TABLE 15

|  | | Example 57 | Example 58 | Example 59 | Example 60 | Example 61 | Example 62 |
|---|---|---|---|---|---|---|---|
| First HC | Coating material | H1-1 | H1-1 | H1-1 | H1-1 | H1-1 | H1-1 |
|  | Thickness μm | 2 | 2 | 2 | 2 | 2 | 2 |
|  | Preheating for irradiation ° C. | 60 | 60 | 40 | 80 | 40 | 80 |
|  | Integrated amount of light mJ/cm² | 480 | 480 | 480 | 480 | 480 | 480 |

TABLE 15-continued

|  |  | Example 57 | Example 58 | Example 59 | Example 60 | Example 61 | Example 62 |
|---|---|---|---|---|---|---|---|
| Second HC | Coating material | H2-1 | H2-1 | H2-1 | H2-1 | H2-1 | H2-1 |
|  | Thickness μm | 22 | 22 | 22 | 22 | 22 | 22 |
|  | Preheating for irradiation ° C. | 90 | 90 | 90 | 90 | 90 | 90 |
|  | Integrated amount of light mJ/cm$^2$ | 230 | 300 | 80 | 80 | 120 | 120 |
| Evaluation results | Total light transmission rate % | 90.0 | 90.0 | 90.0 | 90.0 | 90.0 | 90.0 |
|  | Y value of XYZ color system % | 2.6 | 2.6 | 2.6 | 2.6 | 2.6 | 2.6 |
|  | Haze % | 7.5 | 7.5 | 7.5 | 7.5 | 7.5 | 7.5 |
|  | Pencil hardness | 7H | 7H | 7H | 7H | 7H | 7H |
|  | Minimum bending radius mm | 30 | 30 | 30 | 30 | 30 | 30 |
|  | Water contact angle deg | 116 | 116 | 110 | 116 | 110 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.2 | 0.2 |
|  | Surface smoothness | ⊚ | ⊚ | ⊚ | ⊚ | ⊚ | ⊚ |
|  | Square lattice pattern test | Classification 3 | Classification 4 | Classification 0 | Classification 0 | Classification 1 | Classification 1 |
|  | Cutting processability | ⊚-⊚ | ⊚-⊚ | ⊚-⊚ | ⊚-⊚ | ⊚-⊚ | ⊚-⊚ |

TABLE 16

|  |  | Example 63 | Example 64 | Example 65 | Example 66 | Example 67 | Example 68 |
|---|---|---|---|---|---|---|---|
| First HC | Coating material | H1-1 | H1-1 | H1-1 | H1-1 | H1-1 | H1-1 |
|  | Thickness μm | 2 | 2 | 2 | 2 | 2 | 2 |
|  | Preheating for irradiation ° C. | 25 | 40 | 80 | 110 | 40 | 80 |
|  | Integrated amount of light mJ/cm$^2$ | 480 | 480 | 480 | 480 | 480 | 480 |
| Second HC | Coating material | H2-1 | H2-1 | H2-1 | H2-1 | H2-1 | H2-1 |
|  | Thickness μm | 22 | 22 | 22 | 22 | 22 | 22 |
|  | Preheating for irradiation ° C. | 90 | 90 | 90 | 90 | 90 | 90 |
|  | Integrated amount of light mJ/cm$^2$ | 160 | 160 | 160 | 160 | 230 | 230 |
| Evaluation results | Total light transmission rate % | 90.0 | 90.0 | 90.0 | 90.0 | 90.0 | 90.0 |
|  | Y value of XYZ color system % | 2.6 | 2.6 | 2.6 | 2.6 | 2.6 | 2.6 |
|  | Haze % | 7.5 | 7.5 | 7.5 | 7.5 | 7.5 | 7.5 |
|  | Pencil hardness | 7H | 7H | 7H | 7H | 7H | 7H |
|  | Minimum bending radius mm | 30 | 30 | 30 | 30 | 30 | 30 |
|  | Water contact angle deg | 110 | 110 | 116 | 110 | 110 | 116 |
|  | Abrasion resistance 1 | A | A | A | A | A | A |
|  | Abrasion resistance 2 | A | A | A | A | A | A |
|  | Yellowness index | 0.2 | 0.2 | 0.2 | 0.2 | 0.2 | 0.2 |
|  | Surface smoothness | ⊚ | ⊚ | ⊚ | ⊚ | ⊚ | ⊚ |
|  | Square lattice pattern test | Classification 5 | Classification 2 | Classification 2 | Classification 5 | Classification 3 | Classification 3 |
|  | Cutting processability | ⊚-⊚ | ⊚-⊚ | ⊚-⊚ | ⊚-⊚ | ⊚-⊚ | ⊚-⊚ |

From these experimental results, it has been found that a preferable anti-glare hard coat laminated film according to at least one embodiment is excellent in anti-glare property, abrasion resistance, surface hardness, and finger slidability. In addition, it has been found that a preferable anti-glare hard coat laminated film according to at least one embodiment is also excellent in bending resistance, color tone, appearance, interlayer adhesion strength, and cutting processability. Therefore, this anti-glare hard coat laminated film can be used suitably as a member of an image display apparatus such as a liquid crystal display, a plasma display, or an electroluminescence display (including an image display apparatus having a touch panel function and an image display apparatus having no touch panel function), particularly as a member of an apparatus having a touch panel function, often used in an environment where light from the outside is incident on a screen, such as a car navigation apparatus.

REFERENCE SIGNS LIST

1 First hard coat
2 Second hard coat
3 First poly(meth)acrylimide resin layer (α1)
4 Aromatic polycarbonate resin layer (β)
5 Second poly(meth)acrylimide resin layer (α2)
6 Third hard coat
7 Ultraviolet irradiator
8 Mirror-finished metal roll
9 Web
10 Holding angle
11 Melted resin film
12 Co-extrusion T-die
13 First mirror-finished roll
14 Second mirror-finished roll

The invention claimed is:

1. A hard coat laminated film, comprising, in order from a surface layer side, a first hard coat, a second hard coat, and a transparent resin film layer,
   wherein the first hard coat is formed of a coating material comprising:
   (A) 100 parts by mass of a polyfunctional (meth)acrylate;
   (B) 0.01 to 7 parts by mass of a water repellent;
   (C) 0.01 to 10 parts by mass of a silane coupling agent; and
   (D) 0.1 to 10 parts by mass of resin microparticles having an average particle diameter of 0.5 to 10 μm, and containing no inorganic particles;

wherein the second hard coat is formed of a coating material containing inorganic particles; and wherein the following (ii) is satisfied:

(ii) a pencil hardness on the first hard coat surface of 7H or more.

2. The hard coat laminated film according to claim 1, comprising, in order from a surface layer side, the first hard coat, the second hard coat, and the transparent resin film layer, wherein the second hard coat is formed of a coating material comprising:

(A) 100 parts by mass of the polyfunctional (meth)acrylate; and (E) 50 to 300 parts by mass of inorganic microparticles having an average particle diameter of 1 to 300 nm.

3. The hard coat laminated film according to claim 1, wherein the (C) silane coupling agent comprises one or more selected from the group consisting of a silane coupling agent having an amino group and a silane coupling agent having a mercapto group.

4. The hard coat laminated film according to claim 1, wherein the (B) water repellent comprises a (meth)acryloyl group-containing fluoropolyether water repellent.

5. The hard coat laminated film according to claim 1, wherein the second hard coat forming coating material further comprises 0.01 to 1 part by mass of (F) a leveling agent.

6. The hard coat laminated film according to claim 1, wherein the first hard coat has a thickness of from 0.5 to 5 μm.

7. The hard coat laminated film according to claim 1, wherein the second hard coat has a thickness of from 15 to 30 μm.

8. A hard coat laminated film, comprising, in order from a surface layer side, a first hard coat, a second hard coat, and a resin film layer, wherein the first hard coat is formed of a coating material containing a water repellant and no inorganic particles, wherein the second hard coat is formed of a coating material containing inorganic particles, and wherein the following (i) to (iii) are satisfied:

(i) a total light transmission rate of 85% or more;

(ii) a pencil hardness on the first hard coat surface of 7H or more;

(iii) a Y value of XYZ color system of 1.5 to 4.2%.

9. The hard coat laminated film according to claim 8, wherein the hard coat laminated film has a minimum bending radius of 40 mm or less.

10. The hard coat laminated film according to claim 8, wherein the hard coat laminated film has a water contact angle at the first hard coat surface after 10,000 reciprocating wipes with a cotton of 100° or more.

11. An image display apparatus, comprising the hard coat laminated film according to claim 1.

12. The hard coat laminated film according to claim 8, wherein the first hard coat is formed of a coating material containing no inorganic particles, and containing resin microparticles.

13. The hard coat laminated film according to claim 8, wherein the hard coat laminated film has a yellowness index of 3 or less.

14. The hard coat laminated film according to claim 8, wherein the first hard coat has a thickness of from 0.5 to 5 μm.

15. The hard coat laminated film according to claim 8, wherein the second hard coat has a thickness of from 15 to 30 μm.

16. An image display apparatus, comprising the hard coat laminated film according to claim 8.

17. The hard coat laminated film according to claim 1, wherein the hard coat laminated film has a Y value of XYZ color system of 1.5 to 4.2%.

* * * * *